US012131607B1

(12) United States Patent
Tsutsui

(10) Patent No.: US 12,131,607 B1
(45) Date of Patent: Oct. 29, 2024

(54) GAMING MACHINE CONTROLLER AND METHOD OF USE

(71) Applicant: Yuichiro Tsutsui, Tokyo (JP)

(72) Inventor: Yuichiro Tsutsui, Tokyo (JP)

(73) Assignee: Prism Solutions, Inc.

( * ) Notice: Subject to any disclaimer, the term of this patent is extended or adjusted under 35 U.S.C. 154(b) by 186 days.

(21) Appl. No.: 17/568,450

(22) Filed: Jan. 4, 2022

Related U.S. Application Data

(63) Continuation-in-part of application No. 15/716,465, filed on Sep. 26, 2017, now Pat. No. 11,213,742.

(60) Provisional application No. 62/400,573, filed on Sep. 27, 2016.

(51) Int. Cl.
*G07F 17/32* (2006.01)
*G07F 17/34* (2006.01)

(52) U.S. Cl.
CPC .......... *G07F 17/3223* (2013.01); *G07F 17/34* (2013.01)

(58) Field of Classification Search
None
See application file for complete search history.

(56) References Cited

U.S. PATENT DOCUMENTS 8,469,800 B2 6/2013 Lemay
8,613,659 B2 12/2013 Nelson
9,153,095 B2 10/2015 Adiraju
9,852,578 B2 12/2017 Nelson
10,395,465 B2 8/2019 Bytnar
2003/0064805 A1 4/2003 Wells
2006/0025222 A1 2/2006 Sekine
2006/0189382 A1 8/2006 Muir
2007/0021198 A1 1/2007 Muir
2011/0065496 A1 3/2011 Gagner
2011/0207531 A1 8/2011 Gagner
2011/0210831 A1* 9/2011 Talty ........................ H04W 4/21 340/10.51
2012/0015735 A1 1/2012 Abouchar
2012/0190455 A1 7/2012 Briggs
2013/0023339 A1 1/2013 Davis
2013/0053136 A1 2/2013 Lemay
2013/0130777 A1 5/2013 Lemay
2013/0130786 A1 5/2013 Robbins
2013/0165199 A1 6/2013 Lemay
2013/0165231 A1 6/2013 Nelson
2013/0165232 A1 6/2013 Nelson
2013/0167208 A1 6/2013 Shi
2013/0203489 A1 8/2013 Lyons
2013/0281207 A1 10/2013 Lyons
2013/0303263 A1 11/2013 Lemay
(Continued)

*Primary Examiner* — Seng H Lim
(74) *Attorney, Agent, or Firm* — Allen D Hertz, P.A.; Allen D. Hertz

(57) ABSTRACT

An application enabling a player to utilize a portable computing device, such as a Smartphone, to function as a game controller for a gaming machine. The portable computing device is paired with the gaming machine using a pairing based, short range protocol. The portable computing device enables manual user input or use of motion controllers for controlling skill based games in a casino environment. The application can receive a configuration from the gaming machine to replicate or mimic the controls and the gaming images, thus enabling the player to play the game at a short distance from the machine. The player can select an image/theme for integration into the game during play.

20 Claims, 13 Drawing Sheets

(56) References Cited

U.S. PATENT DOCUMENTS

| | | | | |
|---|---|---|---|---|
| 2013/0310159 | A1 | 11/2013 | Froy | |
| 2013/0324237 | A1 | 12/2013 | Adiraju | |
| 2013/0337878 | A1* | 12/2013 | Shepherd | G07F 17/3244 463/31 |
| 2014/0018153 | A1 | 1/2014 | Nelson | |
| 2014/0094272 | A1 | 4/2014 | Kelly | |
| 2014/0141864 | A1 | 5/2014 | Ward | |
| 2014/0162768 | A1* | 6/2014 | Nelson | G07F 17/3241 463/25 |
| 2014/0200065 | A1 | 7/2014 | Anderson | |
| 2015/0087369 | A1 | 3/2015 | Mcintyre | |
| 2015/0228153 | A1 | 8/2015 | Hedrick | |
| 2015/0325077 | A1 | 11/2015 | Lyons | |
| 2016/0014545 | A1 | 1/2016 | Tian | |
| 2016/0027244 | A1 | 1/2016 | Adiraju | |
| 2016/0027249 | A1 | 1/2016 | Nelson | |
| 2016/0037346 | A1* | 2/2016 | Boettcher | H04W 12/04 455/411 |
| 2016/0093166 | A1 | 3/2016 | Panambur | |
| 2016/0374133 | A1* | 12/2016 | Logue | H04W 76/14 |
| 2017/0262622 | A1* | 9/2017 | Abrams | G06F 21/35 |
| 2019/0036688 | A1* | 1/2019 | Wasily | H04L 9/3231 |

* cited by examiner

GAMING MACHINE CONTROLLER AND METHOD OF USE

CROSS-REFERENCE TO RELATED APPLICATION

This United States Patent Application is a Continuation-In-Part (CIP) claiming the benefit of U.S. Non-Provisional patent application Ser. No. 15/716,465, filed on Sep. 26, 2017 (scheduled to issue as U.S. Pat. No. 11,213,742 on Jan. 4, 2022), wherein U.S. patent application Ser. No. 15/716,465 is a Non-Provisional Patent Application claiming the benefit of U.S. Provisional Patent Application Ser. No. 62/400,573, filed on Sep. 27, 2016, both of which are incorporated in their entireties by reference herein.

FIELD OF THE INVENTION

The present invention relates to a gaming machine controller. More specifically, the present invention relates to a use of a portable computing device, such as a Smartphone, a portable computing tablet, and the like, as a gaming machine controller and processes of pairing the portable computing device and an Electronic Gaming Machine (EGM), playing a game on the portable computing device, using the device to provide inputs to the game, using motion of the device to provide inputs to the game, revising images/themes on the game, etc.

BACKGROUND OF THE INVENTION

Gaming machines, such as slot machines, automated table game machines, and the like are controller by user input devices that are integrated into the machine. In a second example, slot machines include a slot machine arm to spin the wheels. In another example, automated table game machines include a series of buttons or other input components to instruct the machine on how the player desires to play the game.

The use of user input components that are integrated into the gaming machine limit the user's position respective to the machine. This restricts the player to a certain positions respective to the machine. Commonly, the player sits upon a stool in front of the machine. The player interacts with user input components, such as buttons on a front shelf of the gaming machine and/or a slot machine arm, commonly located on a right side of the gaming machine. This can be uncomfortable for certain players, such as players that are handicapped, players with back issues, players with shoulder issues, and the like.

Connectivity between a portable computing device and an Electronic Gaming Machine (EGM) commonly requires a communication link to a server, which is controlled by network software. It is desired to obtain a direct connection between the portable computing device and the Electronic Gaming Machine (EGM) exclusive of any interactions with the network software.

Wireless connectivity between the portable computing device and the Electronic Gaming Machine (EGM) is preferred to be completed using either of a Wi-Fi protocol or a Bluetooth protocol. Currently, the process of pairing requires an initial communication process with a gaming network for authentication of a player's identification. This process also creates a barrier for applications that are not associated with the gaming network, as the company that develops the gaming network desires to minimize any interactions with software by other developers to maximize profits from sale and use of the gaming network company's products.

Accordingly, there remains a need in the art for a process to enable flexibility for the methods where a player provides inputs to a gaming machine. This can include a method of enabling interactions with the gaming machine via pairing of a portable computing device. The pairing between the portable computing device and the gaming machine is preferred to be independent of the gaming network.

SUMMARY OF THE INVENTION

The present invention overcomes the deficiencies of the known art by disclosing a system and a method for establishing a communication link between a gaming machine and a portable computing device, wherein the link enables a gaming controller application operating on the portable computing device to provide instructions to the gaming machine to play a game thereon.

In accordance with one embodiment of the present invention, the invention consists of a system and a method using a gaming machine controller Application, the method comprising steps of:

- installing a gaming controller application onto a portable computing device;
- activating the gaming controller application;
- establishing a short range, wireless communication link between a gaming machine and the portable computing device; and
- utilizing the gaming controller application to provide instructions to the gaming machine to play a game thereon.

In a second aspect, the method further comprises a step of tapping the portable computing device against a hot spot located on the gaming machine to initiate the step of establishing a short range, wireless communication link between a gaming machine and the portable computing device.

In another aspect, the portable electronic device is a Smartphone.

In yet another aspect, the portable electronic device is a portable computing tablet.

In yet another aspect, the tapping process is accomplished by waving the portable computing device across a hot spot on the gaming machine.

In yet another aspect, the tapping process includes a step of obtaining identifying information associated with the portable computing device.

In yet another aspect, the step of creating a short range link is accomplished utilizing an associating link code obtained from the gaming machine.

In yet another aspect, the associating link code is randomly generated by the gaming machine, a server, or any other suitable computing device. The randomly generated associating link code ensures security respective to the process of creating a link between the gaming machine and the portable computing device. The use of a randomly generated associating link code ensures against a different player entering a known associating link code, where the different player could possibly interfere with or even hijack play on the respective gaming machine.

In yet another aspect, the associating link code is generated by the gaming machine, a server, or any other suitable computing device using information provided by and/or associated with the specific gaming machine.

In yet another aspect, the associating link code is obtained from the gaming machine by reading a human readable presentation of the associating link code.

In yet another aspect, the associating link code is obtained from the gaming machine by scanning a machine readable presentation of the associating link code. Examples of machine readable configurations include any suitable barcode, any suitable Quick Read (QR) code, and the like. The machine readable presentation would be presented upon a display integrated into the gaming machine. The displayed image of the machine readable presentation can be a presented in a dedicated display, the gaming display, or any other suitable shared display located on or proximate the gaming machine.

In yet another aspect, the associating link code is obtained from the gaming machine by scanning a machine readable presentation of the associating link code using a digital image acquisition device (camera) integrated within the portable computing device or Smartphone.

In yet another aspect, the associating link code is obtained using a scanning process employed by an application operating on the portable computing device or Smartphone.

Upon acquisition of the scanned associating link code, the application operating on the portable computing device or Smartphone can request an action from the user or automatically respond to a recipient. The recipient can be a central gaming server, the respective gaming machine, both, or any other suitable recipient.

In yet another aspect, the associating link code is obtained from the gaming machine by scanning a machine readable image comprising a link to a domain and the associating link code. This can be referred to as an embedded associating link code. An exemplary format of the decoded machine readable image is: "https://www.domain.com/example.html?id=example 1"; wherein "www.domain.com" identifies the domain, "example.html" identifies the associated webpage, and "?id=example 1" provides the unique identifier associated with the specific request to establish a link between the gaming machine and the portable computing device or Smartphone. The associated webpage would include instructions to decode the unique identifier associated with the specific request, determine which machine is involved, validate the request, and establish a secured link between the gaming machine and the portable computing device or Smartphone.

In yet another aspect, the associating link code can be predefined.

In yet another aspect, the link can be accomplished via a pairing process.

In yet another aspect, the link can be accomplished via a pairing process utilizing a Bluetooth protocol.

In yet another aspect, the link can be accomplished via a pairing process utilizing a Wi-Fi protocol.

In yet another aspect, the pairing process is completed by selecting a device name associated with Electronic Gaming Machine (EGM).

In yet another aspect, the pairing process is completed by selecting a device name associated with Electronic Gaming Machine (EGM) and entering a pairing code.

In yet another aspect, the pairing code can be provided as a portion of the device name.

In yet another aspect, the pairing code can be provided by scanning a computer readable image.

In yet another aspect, the pairing code can be provided by scanning a computer readable image, wherein the computer readable image is one of a barcode, a quick read (QR) code, or any other suitable computer readable image.

In yet another aspect, the pairing code can be provided by a human readable indicia provided upon the Electronic Gaming Machine (EGM).

In yet another aspect, the pairing code can be provided by tapping a location identifying a near field communication (NFC) transceiver on the Electronic Gaming Machine (EGM).

In yet another aspect, the pairing code can be provided by tapping a location identifying a near field communication (NFC) transceiver on the Electronic Gaming Machine (EGM) after selecting the device name identified in a list of device names of one of a Bluetooth or a Wi-Fi connection selection.

In yet another aspect, the pairing code can be provided by tapping a location identifying a radiofrequency identification (RFID) transceiver on the Electronic Gaming Machine (EGM) after selecting the device name identified in a list of device names of one of a Bluetooth or a Wi-Fi connection selection.

In yet another aspect, the pairing process is completed by selecting a device name associated with Electronic Gaming Machine (EGM) and sending a message to the Electronic Gaming Machine (EGM) requesting the Electronic Gaming Machine (EGM) establish the pairing.

In yet another aspect, the pairing process is completed by selecting a device name associated with Electronic Gaming Machine (EGM), sending a message to the Electronic Gaming Machine (EGM) requesting the Electronic Gaming Machine (EGM) establish the pairing, and establishing a pairing which is accomplished by the Electronic Gaming Machine (EGM).

In yet another aspect, the pairing process includes a decision step to determine if the portable computing device was previously paired with the selected Electronic Gaming Machine (EGM).

In yet another aspect, the pairing process includes a decision step to determine if the portable computing device was previously paired with the selected Electronic Gaming Machine (EGM), whereby in a condition where the portable computing device was previously paired with the selected Electronic Gaming Machine (EGM), the pairing is completed using the same code as previously used.

In yet another aspect, the pairing process includes a decision step to determine if the portable computing device was previously paired with the selected Electronic Gaming Machine (EGM) by inquiring if a pairing code associated with the device name is stored, whereby in a condition where the portable computing device was previously paired with the selected Electronic Gaming Machine (EGM).

In yet another aspect, the pairing process includes a decision step to determine if the portable computing device was previously paired with the selected Electronic Gaming Machine (EGM) by inquiring if a pairing code associated with the device name is stored, whereby in a condition where the portable computing device was previously paired with the selected Electronic Gaming Machine (EGM), the pairing is completed using the same code as stored.

In yet another aspect, the pairing process includes a decision step to determine if the portable computing device was previously paired with the selected Electronic Gaming Machine (EGM), whereby in a condition where the portable computing device was previously paired with the selected Electronic Gaming Machine (EGM), the pairing is completed using the same code as stored and previously used.

In yet another aspect, the predefined associating link code can be printed upon a label, card, or other suitable element.

In yet another aspect, the label, card, or other suitable element displaying the predefined associating link code would be secured to an exterior surface of the gaming machine enclosure.

In yet another aspect, the method further comprises a step of using the obtained identifying information associated with the portable computing device to establish a secured communication link between the portable computing device and the gaming machine.

In yet another aspect, the secured communication link is provided using a near field communication wireless transmission protocol.

In yet another aspect, the secured communication link is provided using a Bluetooth wireless transmission protocol.

In yet another aspect, the secured communication link is provided using a Bluetooth Smart, Bluetooth Low Energy, and/or Bluetooth 4.0 (BLE Bluetooth) wireless transmission protocol.

In yet another aspect, the secured communication link is provided using a Wi-Fi wireless transmission protocol.

In yet another aspect, the tapping process is accomplished using a short range Wi-Fi wireless transmission process.

In yet another aspect, the process further comprises a step of providing the portable computing device with settings associated with the respective gaming machine.

In yet another aspect, the process further comprises a step of providing the portable computing device with settings associated with the respective gaming machine by providing the settings associated with the respective gaming machine from the respective gaming machine.

In yet another aspect, the process further comprises a step of providing the portable computing device with settings associated with the respective gaming machine by providing the settings associated with the respective gaming machine from a system server.

In yet another aspect, the process further comprises a step of mimicking the status or play of game on the respective gaming machine on the portable computing device.

In yet another aspect, the process further comprises a step of mimicking/replicating an image of the game on the respective gaming machine on the portable computing device.

In yet another aspect, the process further comprises a step of mimicking the user input configuration of the game on the respective gaming machine on the portable computing device.

In yet another aspect, the communication between the portable computing device and the gaming machine is encrypted.

In yet another aspect, the method further comprises a step of informing the player that the controls have been transferred to the portable computing device.

In yet another aspect, the process further comprises a step of diverting control of the gaming machine from the portable computing device to the gaming machine when the portable computing device exhibits a low battery condition.

In yet another aspect, the process further comprises a step of offering multiple modes of play. The multiple modes can include bonus rounds, variants of the game, and the like.

In yet another aspect, the process further comprises a step of pausing the game when the communication link between the gaming machine and the portable computing device becomes compromised.

In yet another aspect, the process further comprises a step of terminating the game when the communication link between the gaming machine and the portable computing device becomes compromised for an extended or predetermined period of time.

In yet another aspect, the gaming machine can include an instruction set which modifies the gaming instructions upon successful completion of a link between the gaming machine and the portable computing device or Smartphone.

In yet another aspect, the process can include a method of providing incentives to the player when the player utilizes a link between the gaming machine and the portable computing device or Smartphone.

In yet another aspect, the process can include a method of providing incentives to the player when the player utilizes a link between the gaming machine and the portable computing device or Smartphone, by including a revision to the gaming machine instruction set to provide the incentive to the player.

In yet another aspect, upon successful completion of a link between the gaming machine and the portable computing device or Smartphone, the gaming machine instruction set can include a consideration for at least one bonus spin.

In yet another aspect, upon successful completion of a link between the gaming machine and the portable computing device or Smartphone, the gaming machine instruction set can include a consideration for changes in the game play rules.

In yet another aspect, upon successful completion of a link between the gaming machine and the portable computing device or Smartphone, the gaming machine instruction set can include a consideration for changes in the game payout rules.

In yet another aspect, upon successful completion of a link between the gaming machine and the portable computing device or Smartphone, the gaming machine instruction set can include a percentage increase for a payout.

In yet another aspect, upon successful completion of a link between the gaming machine and the portable computing device or Smartphone, the gaming machine instruction set can include a fixed amount increase for a payout.

In yet another aspect, upon successful completion of a link between the gaming machine and the portable computing device or Smartphone, the gaming machine instruction set can include a consideration for any additional benefit to the player.

In yet another aspect, upon successful completion of a link between the gaming machine and the portable computing device or Smartphone, at least one of the instruction set operated by the gaming machine and the instruction set operated by the Application on the portable computing device can include an ability to modify the game by using customize images while the player plays the game. For example, the modifications to the game played on the gaming machine can include an introduction of characters, animals, or other images or features associated with the player whose portable computing device is linked to the gaming machine. The custom images can be selected and downloaded prior to arriving at the gaming facility, selected and downloaded while at the gaming facility, selected and utilized while linked to the electronic gaming machine, or selected and utilized while playing the game.

In yet another aspect, the user accesses a storage location comprising at least one stored image, where the at least one stored image is suitable for replacement of an image used in a game played upon the Electronic Gaming Machine (EGM).

In yet another aspect, the user accesses a storage location comprising a plurality of stored images, where the plurality of stored images are suitable for replacement of an image used in a game played upon the Electronic Gaming Machine (EGM).

In yet another aspect, the user accesses a storage location comprising at least one stored theme, where the at least one stored theme is suitable for replacement of a theme used in a game played upon the Electronic Gaming Machine (EGM).

In yet another aspect, the user accesses a storage location comprising at least one stored theme, wherein each at least one stored theme comprises a series of images, each image related to the theme, where the at least one stored theme is suitable for replacement of a theme used in a game played upon the Electronic Gaming Machine (EGM).

In yet another aspect, the user accesses a storage location comprising a plurality of stored themes, where the plurality of stored themes are suitable for replacement of a theme used in a game played upon the Electronic Gaming Machine (EGM).

In yet another aspect, the user accesses a storage location comprising a plurality of stored themes, wherein each stored theme comprises a series of images, where the plurality of stored themes are suitable for replacement of a theme used in a game played upon the Electronic Gaming Machine (EGM).

In yet another aspect, a selected image/theme is integrated into the game on the Electronic Gaming Machine (EGM).

In yet another aspect, a selected image/theme is integrated into the game on the Electronic Gaming Machine (EGM) and play of the game is initiated.

In yet another aspect, in a condition where the Electronic Gaming Machine (EGM) offers more than one game, the user can select one game of the more than one game to integrate a selected image/theme into the game.

In yet another aspect, the game comprising the selected image/theme is replicated on the portable computing device.

In yet another aspect, the game comprising the selected image/theme as being played is replicated on the portable computing device.

In yet another aspect, the game comprising the selected image/theme as being played on the portable computing device.

In yet another aspect, the system can enable a player to record video of the game during play.

In yet another aspect, the system can enable a player to pause, rewind and replay video of the game during or after play.

In yet another aspect, the system can enable a player to capture a screen shot or video of the game.

In yet another aspect, the captured screen shot or video of the game can be saved to any digital storage media device in communication with the portable computing device.

In yet another aspect, the captured screen shot or video of the game can be saved to the portable computing device.

In yet another aspect, the captured screen shot or video of the game can be saved to at least one of any digital storage media device in communication with the portable computing device or the portable computing device.

In yet another aspect, the captured screen shot or video of the game can be edited.

In yet another aspect, the system can record video of the game during play just prior to and during a period when the play is considered a win.

In yet another aspect, the system can record video of the game during play just prior to and during a period when the play is considered a jackpot win.

In yet another aspect, the system can record video of the game during play just prior to and during a period when the play is considered a win, wherein the electronic gaming machine includes a camera which records and captures expressions of the player during the same period of time.

In yet another aspect, the system can record video of the game during play just prior to and during a period when the play is considered a win, wherein the electronic gaming machine includes a camera which records and captures expressions of the player during the same period of time, wherein the video of the player and the game are superimposed upon one another.

In yet another aspect, the selected image/theme is deleted from at least one of the portable computing device and the Electronic Gaming Machine (EGM) upon an event.

In yet another aspect, the process can optionally include a decision step to determine if the selected image/theme is current.

In yet another aspect, the selected image/theme is deleted from each of the portable computing device and the Electronic Gaming Machine (EGM) upon the event.

In yet another aspect, the event causing the selected image/theme to be deleted is one of:

- termination of the game;
- termination of the game on the Electronic Gaming Machine (EGM),
- termination of the game on the portable computing device,
- a selection of a different image,
- a switch in the selected image,
- integration of a different selected image into the game,
- pairing between the portable computing device and a different Electronic Gaming Machine (EGM),
- a request to cash out,
- a request to cash out submitted through the portable computing device,
- a request to cash out submitted through the Electronic Gaming Machine (EGM),
- inactivity over a period of time,
- inactivity of the game over a period of time,
- inactivity of the game on the portable computing device over a period of time,
- inactivity of the game on the Electronic Gaming Machine (EGM) over a period of time, or
- a period of time after the game ends.

In yet another aspect, the event causing the selected image/theme to be deleted is at least one of:

- termination of the game;
- termination of the game on the Electronic Gaming Machine (EGM),
- termination of the game on the portable computing device,
- a selection of a different image,
- a switch in the selected image,
- integration of a different selected image into the game,
- pairing between the portable computing device and a different Electronic Gaming Machine (EGM),
- a request to cash out,
- a request to cash out submitted through the portable computing device,
- a request to cash out submitted through the Electronic Gaming Machine (EGM),
- inactivity over a period of time,
- inactivity of the game over a period of time,
- inactivity of the game on the portable computing device over a period of time, inactivity of the game on the Electronic Gaming Machine (EGM) over a period of time, and a period of time after the game ends.

In yet another aspect, each player's account can include a profile which provides guidelines for the modifications for one or more respective gaming machines.

In yet another aspect, the profile of each player's account can be modified by the player.

In yet another aspect, the profile associated with the player's account can reside in the game controller application.

In yet another aspect, the game controller application can include an option to edit the profile associated with the player.

In yet another aspect, the player's account can include multiple profiles, where the player can select one profile for use during the respective play period.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF THE PRESENT INVENTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
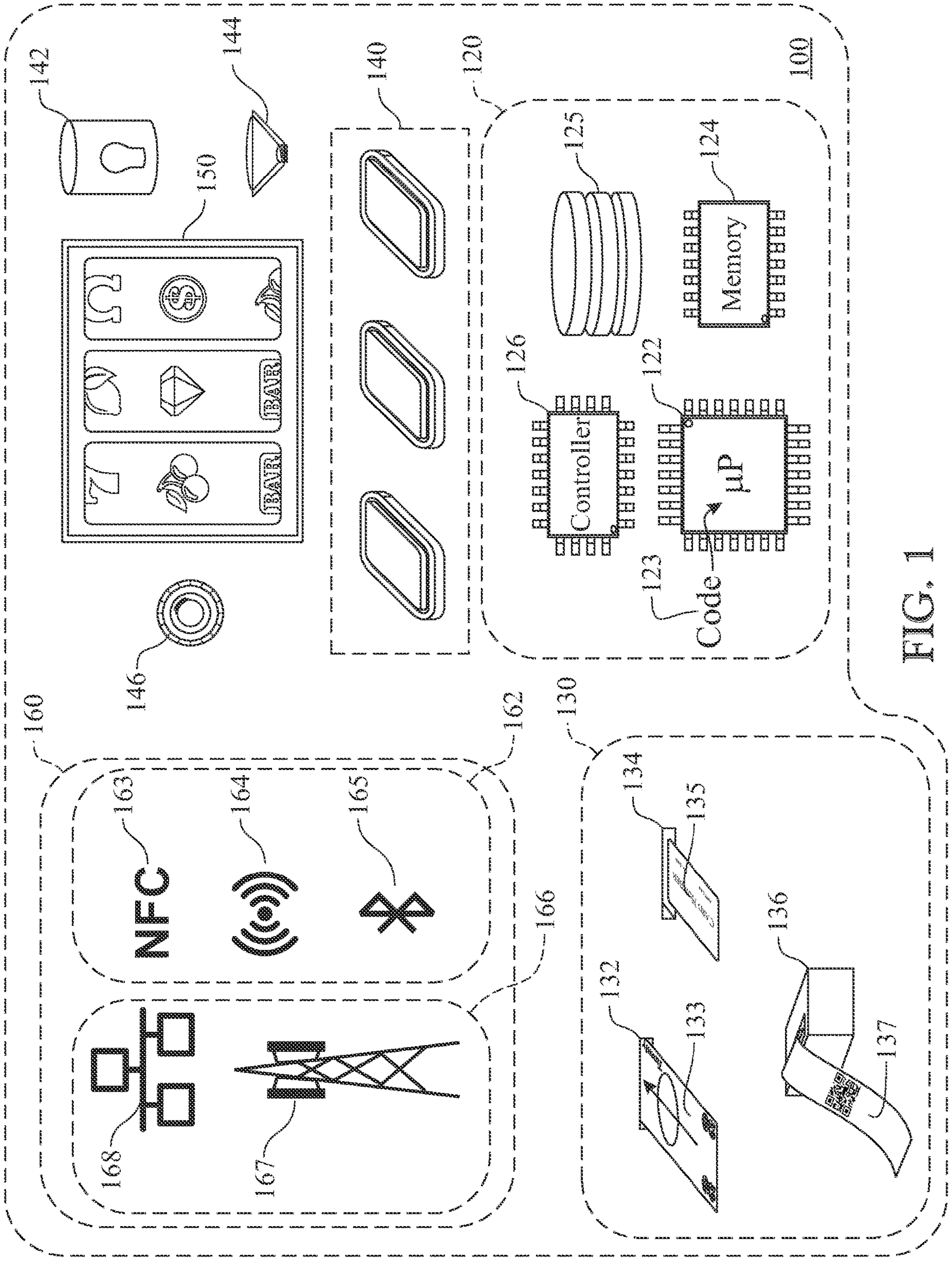
FIG. 1 presents a schematic diagram illustrating components of an exemplary gaming machine.

For purposes of description herein, the terms "upper", "lower", "left", "rear", "right", "front", "vertical", "horizontal", and derivatives thereof shall relate to the invention, when applicable, as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
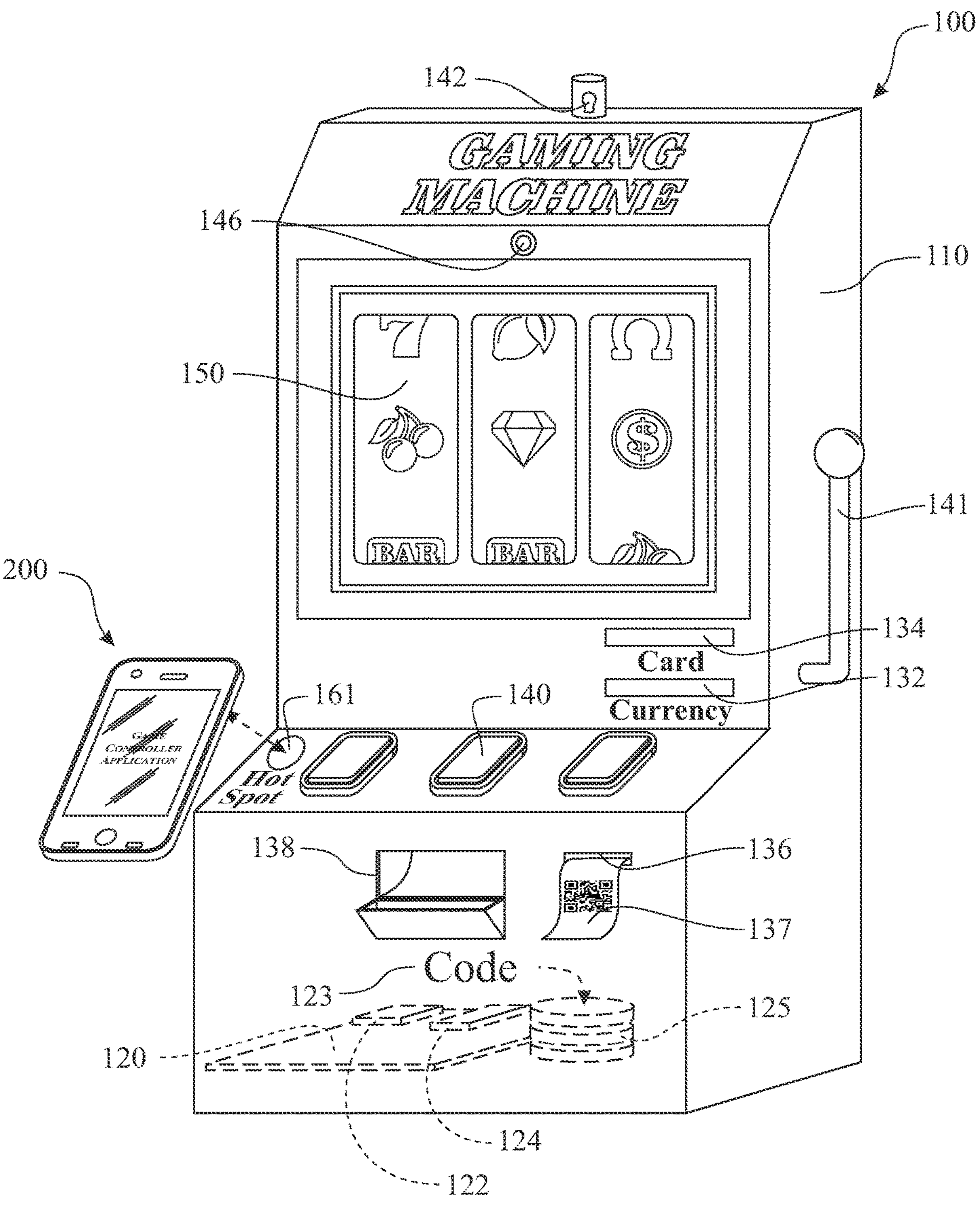
FIG. 3 presents an operational schematic diagram illustrating an exemplary step of tapping the portable computing device against a hot spot of the automated gaming machine to associate the portable computing device and the automated gaming machine with one another.
Figure 4:
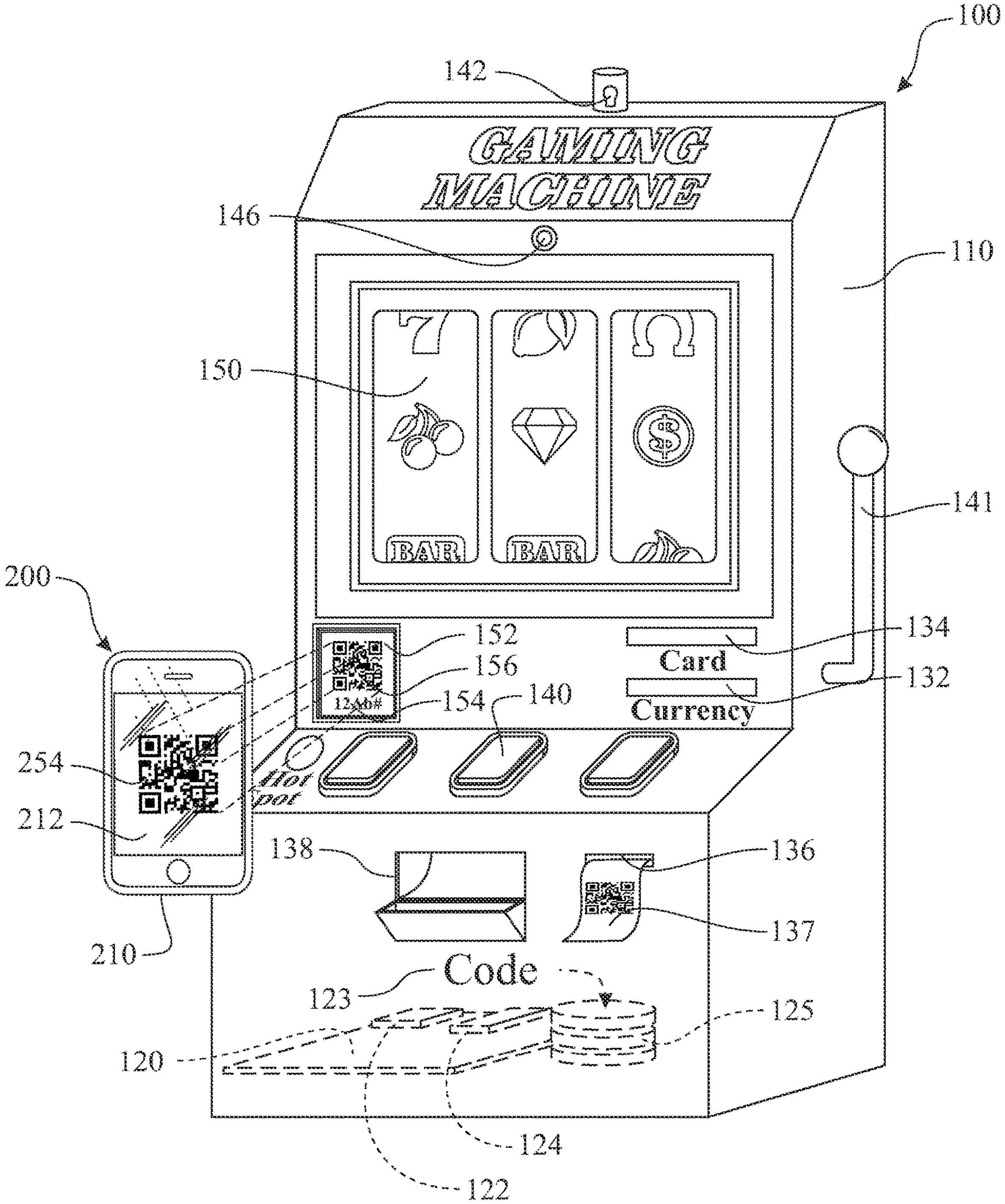
FIG. 4 presents an operational schematic diagram illustrating an exemplary step of acquiring an associating link code from the automated gaming machine to associate or link the portable computing device and the automated gaming machine with one another.
Figure 6:
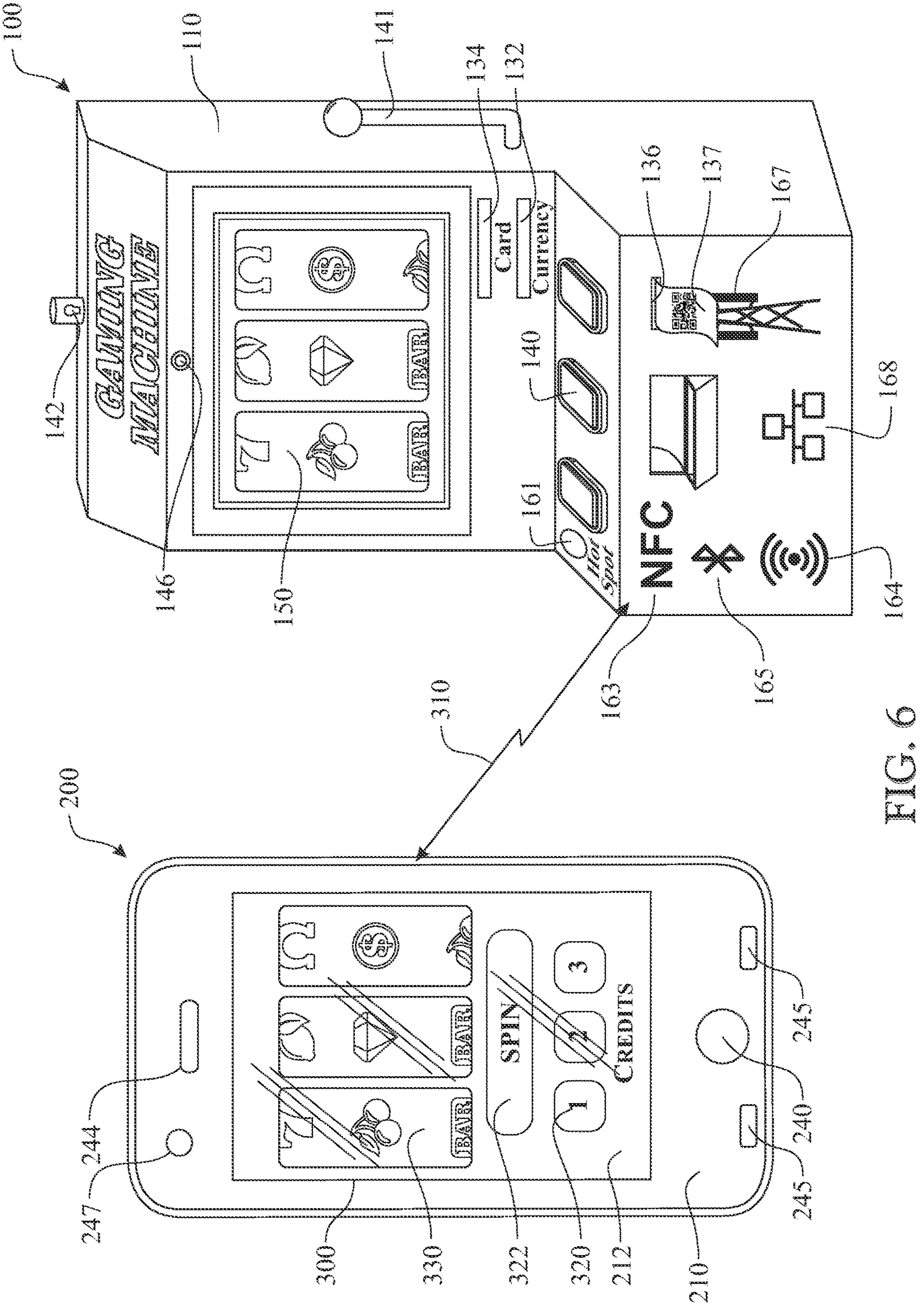
FIG. 6 presents an operational schematic diagram illustrating an exemplary step of employing the portable computing device to provide player instructions to the automated gaming machine.

Currently user input components 140, 141 used for a playing a game on an automated gaming machine 100 are integrated into the automated gaming machine 100, as best shown in the illustration presented in FIGS. 3, 4 and 6. The automated gaming machine 100 can also be referred to as an Electronic Gaming Machine (EGM). The present invention enables a user to utilize a portable computing device 200 as a user input device to operate skilled based games in a casino environment.

Figure 2:
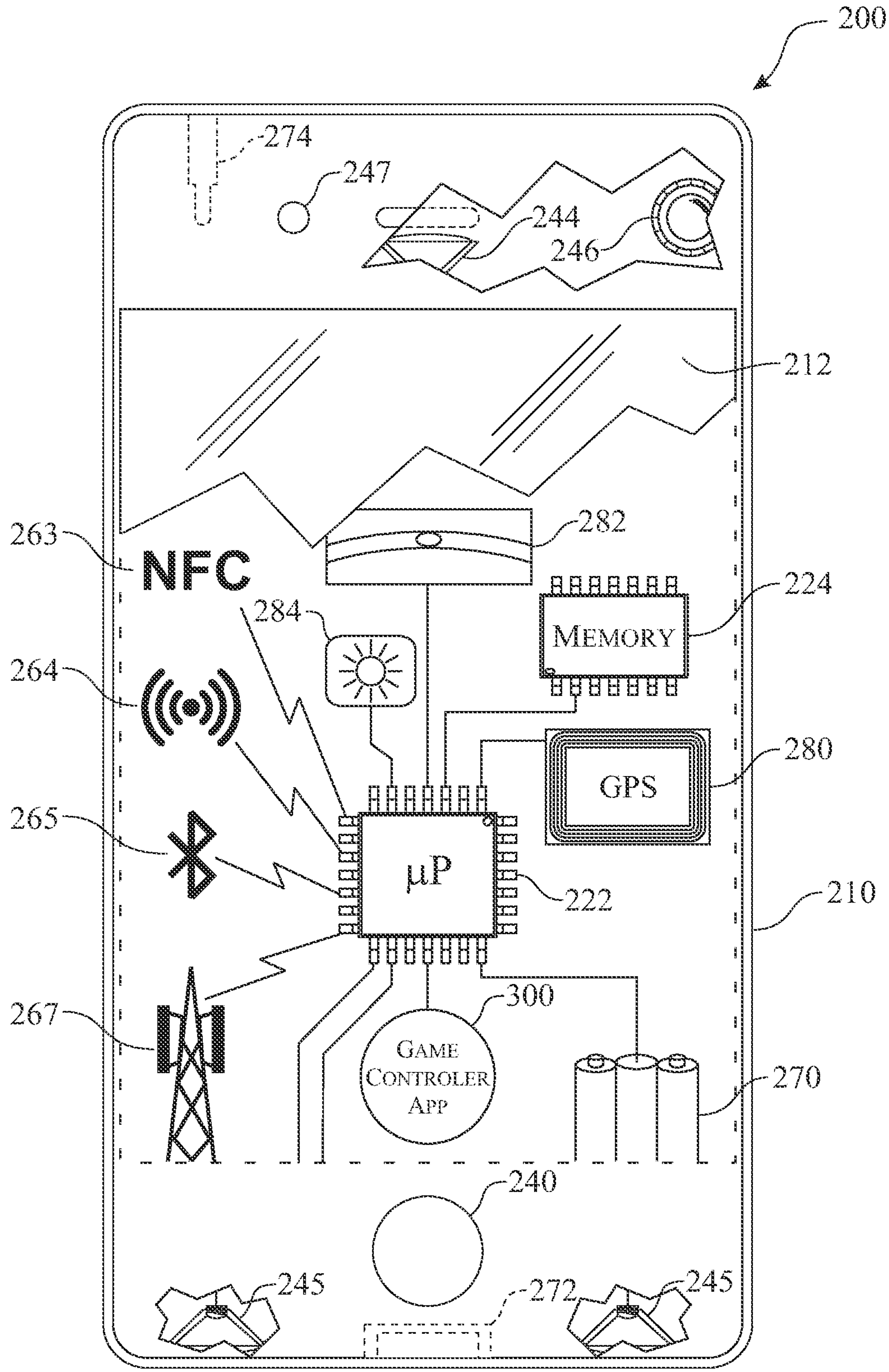
FIG. 2 presents a schematic diagram illustrating components of an exemplary portable computing device, wherein the exemplary portable computing device is illustrated in a form factor of a Smartphone.

Prior to detailing the adaptation of the portable computing device 200 to utilize a portable computing device 200 as a user input device to operate skilled based games in a casino environment, it would be helpful to have knowledge of the various components of each of the automated gaming machine 100 and the portable computing device 200. Details of the automated gaming machine 100 are best presented in the component schematic view presented in FIG. 1 and the operational schematic view illustrated in FIG. 3. Details of the portable computing device 200 are best presented in the component schematic view presented in FIG. 2 and the operational schematic view illustrated in FIG. 6.

A gaming machine enclosure 110 provides the exterior shape and structural foundation for the automated gaming machine 100. The gaming machine enclosure 110 can include sheet metal formed and attached to a frame. The frame supports the various components. The exposed surfaces of the sheet metal can be painted to promote the theme of the associated game to attract the attention of a player. Machine identification and other information, such as a manufacturer, a serial number, gaming approval, and the like can be applied to an exterior of the sheet metal of the gaming machine enclosure 110.

The automated gaming machine 100 includes an operating electronics circuit assembly 120, which provides the operational control of the automated gaming machine 100. The operating electronics circuit assembly 120 includes a microprocessor 122, which operates in accordance with an operating instruction code 123; a non-volatile digital memory device 124, which is provided in signal communication with the microprocessor 122 and used to store information in a digital format wherein the information is readily available for immediate use; a non-volatile digital memory mass storage device 125, which is provided in signal communication with the microprocessor 122 and used to store bulk data; and a gaming controller 126, which is provided in signal communication with the microprocessor 122 and used to control one or more of the functional components of the automated gaming machine 100. From a user interface function, the automated gaming machine 100 includes a user input device 140 and a slot machine arm 141, which provide an ability for a user to make selections and play the game, a visual alerting device 142, which provides a visual alert to the player and others of a sizeable win, such as a jackpot and an audible output device 144 which can provide audible feedback to the player and, at a larger volume, can provide an audible alert to the player and others of a sizeable win, such as a jackpot. A status of the game is presented to the player on an automated gaming mechanism/display 150. Each of the user interface devices 140, 141, 142, 144, 150 is provided in signal communication with the gaming controller 126 and/or the microprocessor 122. The user input device 140 can be of any suitable input device, including a button, a touch screen, a track pad, a track ball, a keypad, and the like. The slot machine arm 141 is included to provide the user with an experience in line with a more mechanically operated machine of yesteryear. It is understood that any suitable user input and/or output device can be included in the automated gaming machine 100 to enhance the user's experience.

The automated gaming machine 100 can optionally include a digital image acquisition device (camera) 146, wherein the digital image acquisition device (camera) 146 is generally used for recording the player's actions and other activities in the area for security purposes. The information acquired by the camera 146 can be stored locally on the non-volatile digital memory mass storage device 125 or remotely, such as on a remotely located server.

The automated gaming machine 100 includes payment processing mechanisms, including a currency handling system 132 for receiving one or more paper currency 133 from the player; a currency dispensing system 138 for dispensing funds; and a printer 136 for printing a printed output 137, wherein the printed output 137 can be in a form of a receipt, a ticket, and the like. The automated gaming machine 100 can additionally include a card reader 134. The card reader 134 provides a capability of reading machine readable cards 135, such as a band card, a credit card, a player loyalty card, and the like. The card reader 134 enables receipt of funds by way of a bank card, a credit card, and the like; an association with a player loyalty account, and any other reasonable function.

Various functions require communication between the automated gaming machine 100 and a remote device, such as a data server, an in house operational server, a credit card clearinghouse (to obtain authorization for the transaction), a banking institution (to obtain authorization for the transaction), and the like. Communication circuitry 160 can be provided in any of a variety of formats, including a proximity wireless communication services 162 and a distant communication services 166. The proximity wireless communication services 162 can use any suitable short range wireless communication, such as a Near Field Communication (NFC) protocol 163, a Wi-Fi communication protocol 164, a Bluetooth communication protocol 165 (including a Bluetooth Smart, Bluetooth Low Energy, Bluetooth 4.0 (BLE Bluetooth) wireless transmission protocol), and the like. The proximity wireless communication circuitry/antenna 162 would be located proximate a hot spot 161 on the gaming machine enclosure 110 of the automated gaming machine 100 at any suitable location that would be accessible by the player. It is understood that any short range wireless communication protocol can be used. It is preferred that the selected short range wireless communication protocol be one that ensures proper and secure communication between the proximity wireless communication services 162 and the player's automated gaming machine 100, and avoids any communication between either the proximity wireless communication services 162 or the player's automated gaming machine 100 and an unwanted third party portable electronic device. The communication circuit 160 can additionally provide encryption to enhance the overall security of the communication between the automated gaming machine 100 and the portable computing device 200.

The distant communication services 166 can use any suitable long range, secured wired and/or wireless communication, such as an Ethernet communication protocol 168, a cellular communication protocol 167, and the like. It is understood that any suitable long range, secured wired and/or wireless communication protocol can be used. The proximity wireless communication services 162 and the distant communication services 166 would be in signal communication with the microprocessor 122.

The automated gaming machine 100 can be provided in a form of any automated gaming device, including a slot machine, including a three wheel machine, a five wheel machine, an animated version, and the like; an automated table game including a poker game, a roulette game, a blackjack game, craps, a baccarat game, and the like; or any other automated gambling application. The automated gaming machine 100 can be enhanced to play skill based games in a casino environment. The user input device 140, slot machine arm 141, and the automated gaming mechanism/display 150 would be configured according to the selected game. The automated gaming machine 100 can include additional user interface components to support the skilled based games.

The microprocessor 122 can include an instruction set adapted for a remotely operated gaming controller. The instruction set can be tailored specifically to the game or games available on the specific automated gaming machine 100. The instruction set can include information which mimics the user input functions/configuration, mimic the game components, replicate operation of the game in real time, replicate images of the game in real time, and the like. Details of this function will be described later herein in conjunction with the operation of the present invention. Alternatively, the game specific information could be provided by a remotely located information server.

The portable computing device 200 can be any suitable portable computing device, including a Smartphone, a portable computing tablet, a personal data assistant, a portable electronic wallet, or any other suitable portable computing device comprising the associated functions. The exemplary portable computing device 200 is a Smartphone. Although the components described herein are directed towards the Smartphone, it is understood that the components integrated into the portable computing device 200 would be those associated with the specific form factor.

A portable computing device housing 210 provides the exterior shape and structural foundation for the portable computing device 200. The portable computing device housing 210 can be fabricated of any suitable material, including plastic, glass reinforced plastic, metal, and the like. The portable computing device housing 210 supports and protects the various components of the portable computing device 200.

The portable computing device 200 includes a microprocessor 222, which operates in accordance with a set of operating instruction, which includes a game controller application 300 (introduced in FIG. 6) and a non-volatile digital memory device 224, which is provided in signal communication with the microprocessor 222 and used to store information in a digital format.

Motion and location information can be acquired by a Global Positioning System (GPS) circuitry 280 (or a similar locating system), an electronic gyroscope and/or level 282, an electronic compass (not shown), and the like. Each of the motion and location sensing devices is provided in signal communication with the microprocessor 222.

The portable computing device 200 includes user interface components, such as a portable computing device touch screen display 212, a user input device 240, an audible output device 244, an audible input/output device 245, a first digital image acquisition device (camera) 246, and the like. The portable computing device display 212 can be a standard liquid crystal display, a touch screen display, and the like. The portable computing device display 212 can include a backlighting system, such as an electroluminescent panel, and the like. The user interface components can additionally include a keypad, a stylus, a track pad, a trackball, and the like.

The portable computing device 200 includes communication circuits, near field communication services, such as a Near Field Communication (NFC) protocol 263, a Wi-Fi communication protocol 264, a Bluetooth communication protocol 265, and the like and far field communication services, such as Bluetooth communication protocol 265, cellular communication protocol 267, and the like. The communication circuits are in signal communication with the microprocessor 222.

The portable computing device 200 can include optional ancillary components, such as a first digital image acquisition device (camera) 246, a second digital image acquisition device (camera) 247, a general interface connector 272, an audio connector 274, a light sensing device 284, and others. The first digital image acquisition device (camera) 246 enables capturing images from a rear face of the portable computing device 200. The second digital image acquisition device (camera) 247 enables capturing images from a front face of the portable computing device 200. The general interface connector 272 enables connectivity for data transfers, power, connectivity to other devices, and the like. The audio connector 274 enables audio output to a remote device, such as a headphone, ear-buds, and the like. The light sensing device 284 is employed to determine an ambient lighting and consequently adjust the backlighting of the portable computing device display 212, establish a flash setting when using the first digital image acquisition device (camera) 246, and the like.

Power is provided to the electronically operated components by a portable power supply 270. A power regulating circuit (voltage and/or amperage) can be integrated between the portable power supply 270 and one or more of the electrically powered components to ensure proper and adequate power distribution.

The game controller application 300, introduced in FIG. 6, is adapted to utilize the components of the portable computing device 200 to provide communication between the automated gaming machine 100 and the portable computing device 200, provide user inputs through any of the user entry components, provide user inputs through any of the motion detecting components, and the like. The user entry components can include one or more digital buttons 240, the touch screen display 212, and any other user entry device included in the portable computing device 200. Additionally, the portable computing device 200 can obtain audible inputs through the audible input/output device 245, which can be adapted for use as instructions while playing the game on the automated gaming machine 100. The inclusion of a touch screen 212 enables an adaptable user input configuration. The touch screen 212 provides an ability for use of a graphical user interface that can be modified to mimic any user input configuration of any automated gaming machine 100.

The use of the portable computing device 200 to provide user input into the game introduces the ability to obtain user inputs from motion of the portable computing device 200. The typical user input components 140, 141 integrated into the automated gaming machine 100 are fixed to the gaming machine enclosure 110. Therefore, they are unable to provide a freedom of motion input function.

Figure 5:
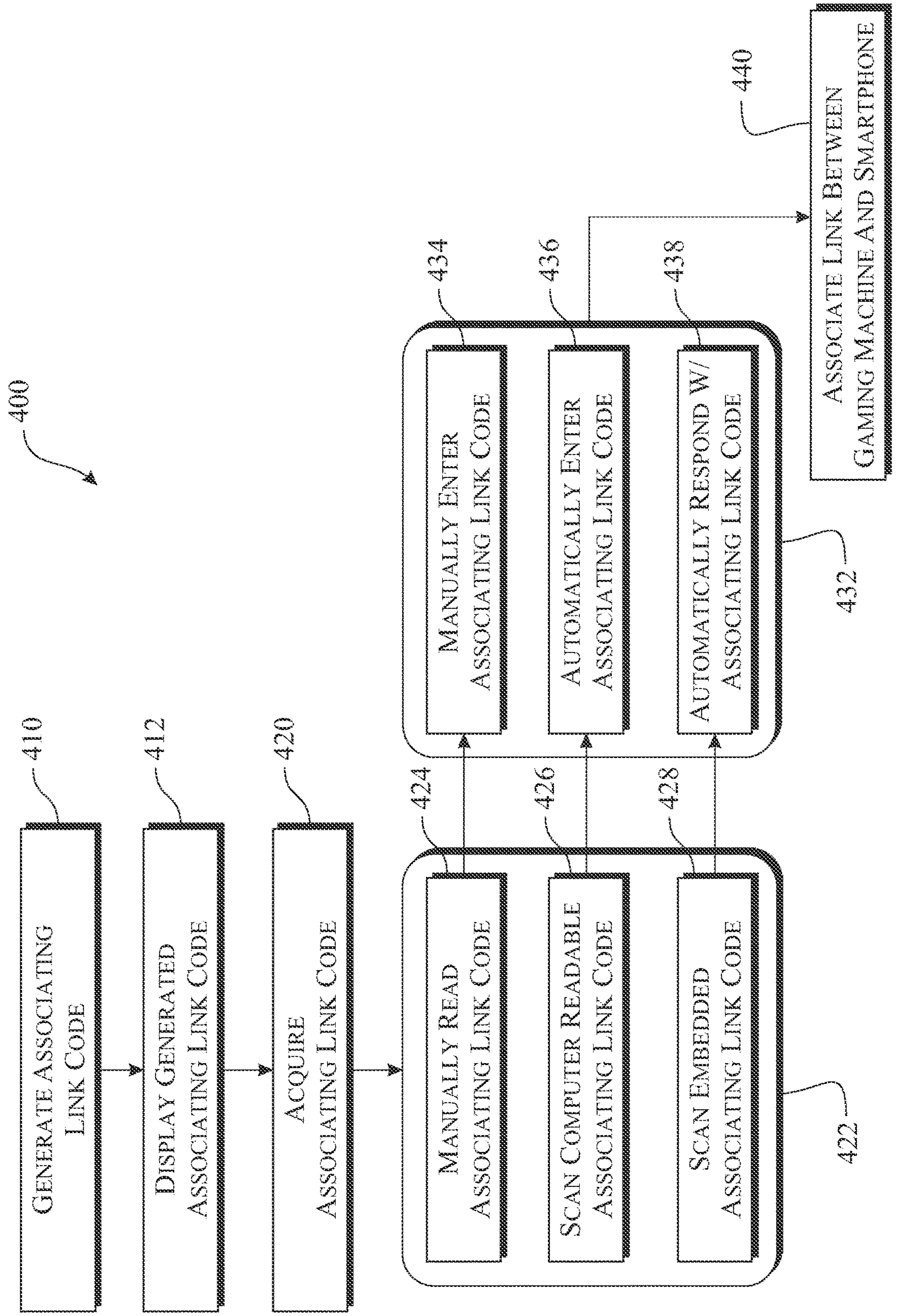
FIG. 5 presents a flow diagram illustrating exemplary operational steps of a method of establishing an association or a link between the automated gaming machine and the portable computing device with one another in accordance with the present invention.

A hot spot 161 enables use of a tapping process or other wireless communication process for creating an association or a wireless link between the automated gaming machine 100 and the portable computing device 200. It is recognized that other methods can be utilized to create the same association or wireless link between the automated gaming machine 100 and the portable computing device 200. Several examples are presented in FIGS. 4 and 5.

The automated gaming machine 100 can optionally include an association linking code display 152 (not shown in FIGS. 3 and 6). A human readable association linking code image 154 and/or a machine readable association linking code image 156 can be presented on the automated gaming mechanism/display 150, the optional association linking code display 152, or any other suitable display located on or proximate the automated gaming machine 100. The use of the human readable association linking code image 154 and/or the machine readable association linking code image 156 is described in an exemplary gaming machine to Smartphone associating link flow diagram 400 illustrated in FIG. 5. The gaming machine to Smartphone associating link flow diagram 400 would initiate with a step of generating an associating link code (step 410). The associating link code could be generated by the operating instruction code 123 of the automated gaming machine 100, a server associated with the automated gaming machines 100 installed in the facility, or any other suitable associating link code generation device. The associating link code is converted to a predetermined image format for presentation on the association linking code display 152. This can include a human readable association linking code image 154, a machine readable association linking code image 156 or a combination of both the human readable association linking code image 154 and the machine readable association linking code image 156, as illustrated. The human readable association linking code image 154 can be a numeric sequence, an alphabetical sequence, an alpha-numeric sequence, a character sequence, or any other suitable sequence. The predetermined image format would be presented on the association linking code display 152 (step 412).

It is understood that a more basic alternative can be employed. The associating link code can be predetermined and more permanently displayed on the automated gaming machine 100. The associating link code can be printed upon a label, card, or other suitable element, where the label, card, or other suitable element would be secured to an exterior surface of the gaming machine enclosure 110.

The player would acquire the associating link code using any suitable method (step 420). Several exemplary methods are included as acquiring gaming machine and Smartphone associating link options 422. Each of the optional exemplary methods included in the acquiring gaming machine and Smartphone associating link options 422 employs an associated method of responding, such as those identified as entering gaming machine and Smartphone associating link options 432.

In a first exemplary solution, the human readable association linking code image 154 can be manually read by the player (step 424). The manually read human readable association linking code image 154 is then manually entered into an application operating on the portable computing device 200 (step 434). The application would transmit any and all necessary information to a predetermined recipient. The information can include the associating link code, the geographic position where the portable computing device 200 is currently located, player information, identification information of the portable computing device 200, and any other information required or desired to create a link between the portable computing device 200 and the automated gaming machine 100. The information can be pre-programmed into the application, manually entered during the process of creating the link between the portable computing device 200 and the automated gaming machine 100, automatically entered during the process of creating the link between the portable computing device 200 and the automated gaming machine 100, or any combination in part or in whole thereof. The information would then be forwarded to a target recipient. The final recipient of the information would be the automated gaming machine 100. The automated gaming machine 100 would utilize the received information to establish the link between the portable computing device 200 and the automated gaming machine 100 (step 440).

In a second exemplary solution, the machine readable association linking code image 156 is acquired using an image acquisition process (step 426). In this solution, the machine readable association linking code image 156 would be acquired or scanned using the application. The machine readable association linking code image 156 is acquired using the digital image acquisition device (camera) 246 of the portable computing device 200. The machine readable association linking code image 156 can be any suitable machine readable format, including any suitable barcode, any suitable Quick Read (QR) code, or any other suitable machine readable format. The decoded associating link code would be automatically provided to the application (step 436). The application would then operate as previously described to create the link between the portable computing device 200 and the automated gaming machine 100.

In a third exemplary solution, the machine readable association linking code image 156 is acquired using an image acquisition process (step 428). In this solution, the machine readable association linking code image 156 would automatically activate a website or an application on the portable computing device 200. The machine readable association linking code image 156 would include a link to automatically activate the website or the application on the portable computing device 200. An exemplary format of the respective machine readable image is: "https://www.domain.com/example.html?id=example 1"; wherein "www.domain.com" identifies the domain, "example.html" identifies the associated webpage, and "?id=example 1" provides the unique identifier associated with the specific request to establish a link between the automated gaming machine 100 and the portable computing device 200. The associated webpage would include an automated instruction set to decode the unique identifier associated with the specific request from the machine readable association linking code image 156, determine which automated gaming machine 100 issued the associating link code, validates the request, (step 438), which then establishes a secured link between the automated gaming machine 100 and the portable computing device 200 (step 440). The preferred format of the machine readable association linking code image 156 would be a Quick Read (QR code).

Figure 7:
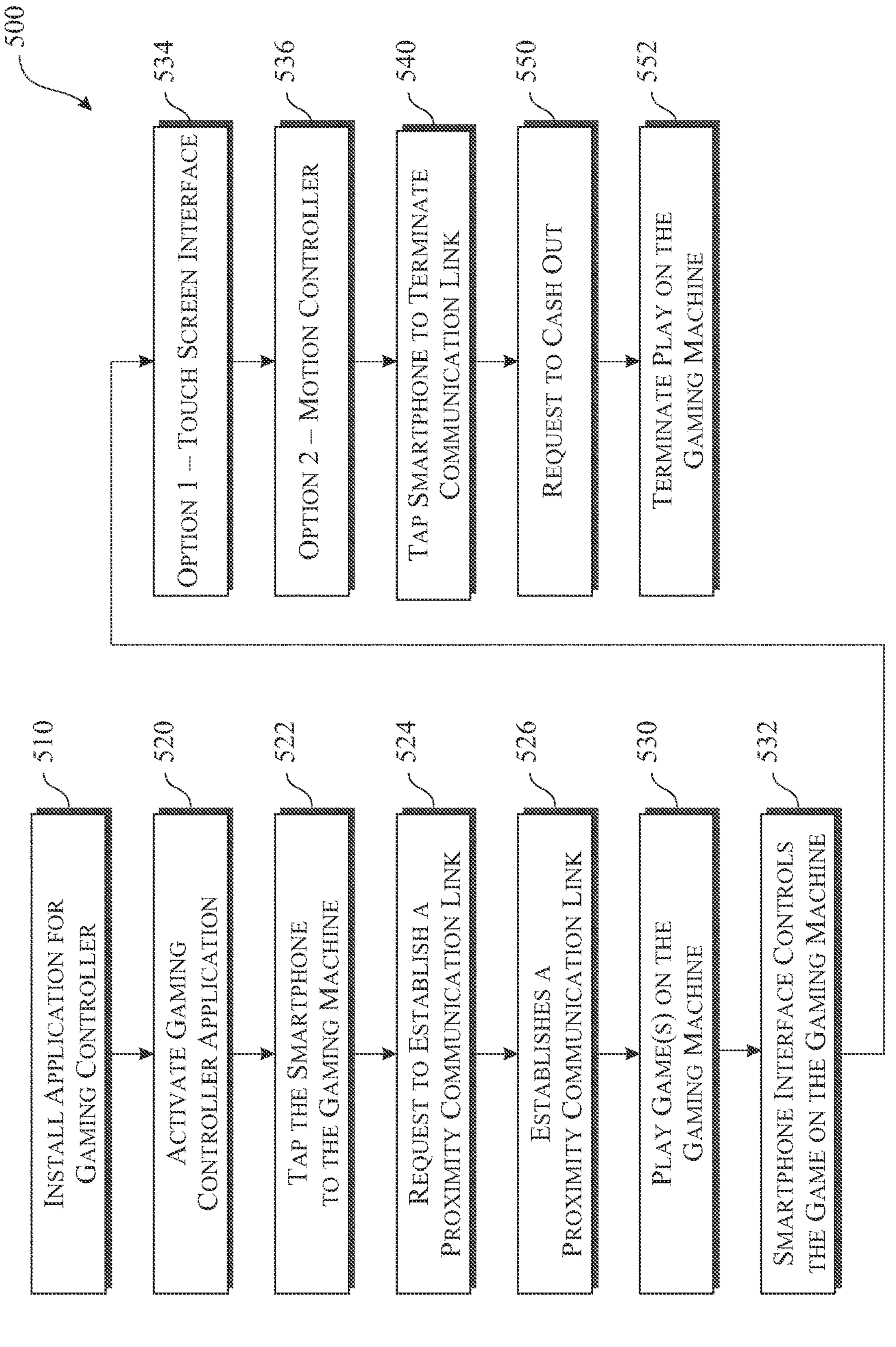
FIG. 7 presents a flow diagram illustrating exemplary operational steps of a method of using a portable computing device as a gaming controller for providing player instructions to a gaming machine in accordance with the present invention.

Use of the portable computing device 200 as a game controller is illustrated in FIGS. 3, 4 and 6 and described in a game controller application flow diagram 500 presented in FIG. 7. The player would install the game controller application 300 onto the portable computing device 200 using any known application installation process (step 510). The player would activate the game controller application 300 (step 520). The player would tap the portable computing device 200 against the automated gaming machine 100 at a location proximate the hot spot 161 (step 522). The term tapping refers to physically contacting, waving across, or any other near field placement of the portable computing device 200 to the hot spot 161 on the gaming machine 100. The tapping process can be accomplished using any suitable short range wireless communication protocol, including, but not limited to the Near Field Communication (NFC) protocol 163, the Wi-Fi communication protocol 164, and/or the Bluetooth communication protocol 165 (including Bluetooth Smart, Bluetooth Low Energy, Bluetooth 4.0 (BLE Bluetooth) wireless transmission protocol). During the process of tapping the portable computing device 200 to the automated gaming machine 100, the portable computing device 200 can provide one or more unique identifiers to the automated gaming machine 100; the automated gaming machine 100 can provide one or more unique identifiers to the portable computing device 200; or both. The unique identifier(s) can be employed to create and retain a secured communication link between the automated gaming machine 100 and the portable computing device 200. Following the tapping step, the automated gaming machine 100 and/or the portable computing device 200 can request to establish a proximity communication link (step 526). This introduces an additional step for security, where the player would approve or reject the request. Upon approval of the request by the player, a bi-directional communication link between the automated gaming machine 100 and the portable computing device 200 is established. The automated gaming machine 100 would monitor the status of the connection throughout the entire period of time that the player is playing a game on the automated gaming machine 100. The player would provide sufficient funds to obtain a desired amount of credits on the automated gaming machine 100. Once the communication link 310 is established and at least a minimum count of credits are posted on the automated gaming machine 100, the player can initiate play of the game(s) on the automated gaming machine 100 (step 530). During play, the player uses the portable computing device 200 to provide input to the automated gaming machine 100 to control the game on the automated gaming machine 100 (step 532). The portable computing device 200 can include a variety of user input functions. In a first option, the user provides guidance to the game by inputting their desired instructions using the touch screen 212 or other contact input components 240 (step 534). In a second option, the user provides guidance to the game by inputting their desired instructions using the motion detection components 280, 282 of the portable computing device 200 (step 536). In a third option, the user can provides guidance to the game by inputting their desired instructions using both, the touch screen 212 or other contact input components 240 and the motion detection components 280, 282.

During the process of playing a game or games on the gaming machine 100, the game controller application 300 can display buttons or icons to replicate the functional input components of the gaming machine 100. In the exemplary embodiment, the game controller application 300 presents a series of credit assertion buttons 320, replicating the same functional components, generically identified as the user input devices 140 and a spin button 322, functionally replicating the slot machine arm 141.

The player would continue to play the game until the total number of available credits is depleted or the player decides to terminate play of the game on the automated gaming machine 100 (step 540).

Alternatively, the length of play on the automated gaming machine 100 can be determined by the remaining credits. An associated number of credits would be subtracted from the total number of pending credits for each game played. An associated number of credits would be added to the total number of pending credits when the player wins a game. This process would continue until the number of credits equals zero or the player decides to discontinue play at the automated gaming machine 100. When the number of credits equals zero, the player can provide funds or tokens to increase the total number of pending credits or elect to discontinue play at the automated gaming machine 100 (step 540). The method in which the player informs the gaming machine 100 that the player desires to terminate play on the gaming machine 100 can vary, wherein the method would be determined by the gaming designer. In one exemplary method to terminate the communication link and play of the game, the user can tap the portable computing device 200 against the automated gaming machine 100 using any of the methods previously described (step 540). When the player decides to discontinue play at the automated gaming machine 100 and the automated gaming machine 100 has a remaining total number of pending credits, the player can request to cash out (step 550). In one exemplary method to request to cash out, the player can tap their portable computing device 200 against the hot spot 161. Since the player was previously established a communication link between the automated gaming machine 100 and the portable computing device 200, the second tapping process would indicate that the player desires to terminate the play at the gaming machine 100 and cash out. When the request to cash out has been submitted, the automated gaming machine 100 would provide the player with the appropriate payout in accordance with the proper procedure. This can include dispensing funds (coins and/or currency), printing a ticket, transferring the value of the credit to an associated banking institution, transferring the value of the credit to an associated credit institution, and the like. Upon completion, the automated gaming machine 100 terminates the gaming session (step 552).

In another alternative method, the gaming machine 100 can monitor the proximity of the associated portable computing device 200 to the gaming machine 100. This can be established during the initial tapping process when the gaming machine 100 identifies an identification of the portable computing device 200. The gaming machine 100 can be placed upon hold when the gaming machine 100 determines that the portable computing device 200 associated with the player travels beyond a predetermined distance from the gaming machine 100. The automated gaming machine 100 can subsequently terminate the play of the game on the automated gaming machine 100 in a condition where the automated gaming machine 100 continues to determine that the portable computing device 200 associated with the player travels beyond a predetermined distance from the gaming machine 100 over a substantial period of time. When the portable computing device 200 associated with the player travels beyond a predetermined distance from the gaming machine 100, the game controller application 300 can present a message asking the player to connect or reinstate the connection between the portable computing device 200 and the automated gaming machine 100.

The game controller application 300 can include a process which would convey a status of the portable power supply 270 of the portable computing device 200 to the automated gaming machine 100. The automated gaming machine 100 can monitor the status or charge level of the portable power supply 270 of the portable computing device 200. In a condition where the status or charge level of the portable power supply 270 of the portable computing device 200 is reduced to a predetermined level, the automated gaming machine 100 would convert from a portable computing device input mode to a different input mode, such as a standard play mode, wherein input is provided through the integrated input devices 140, 141.

Figure 8:
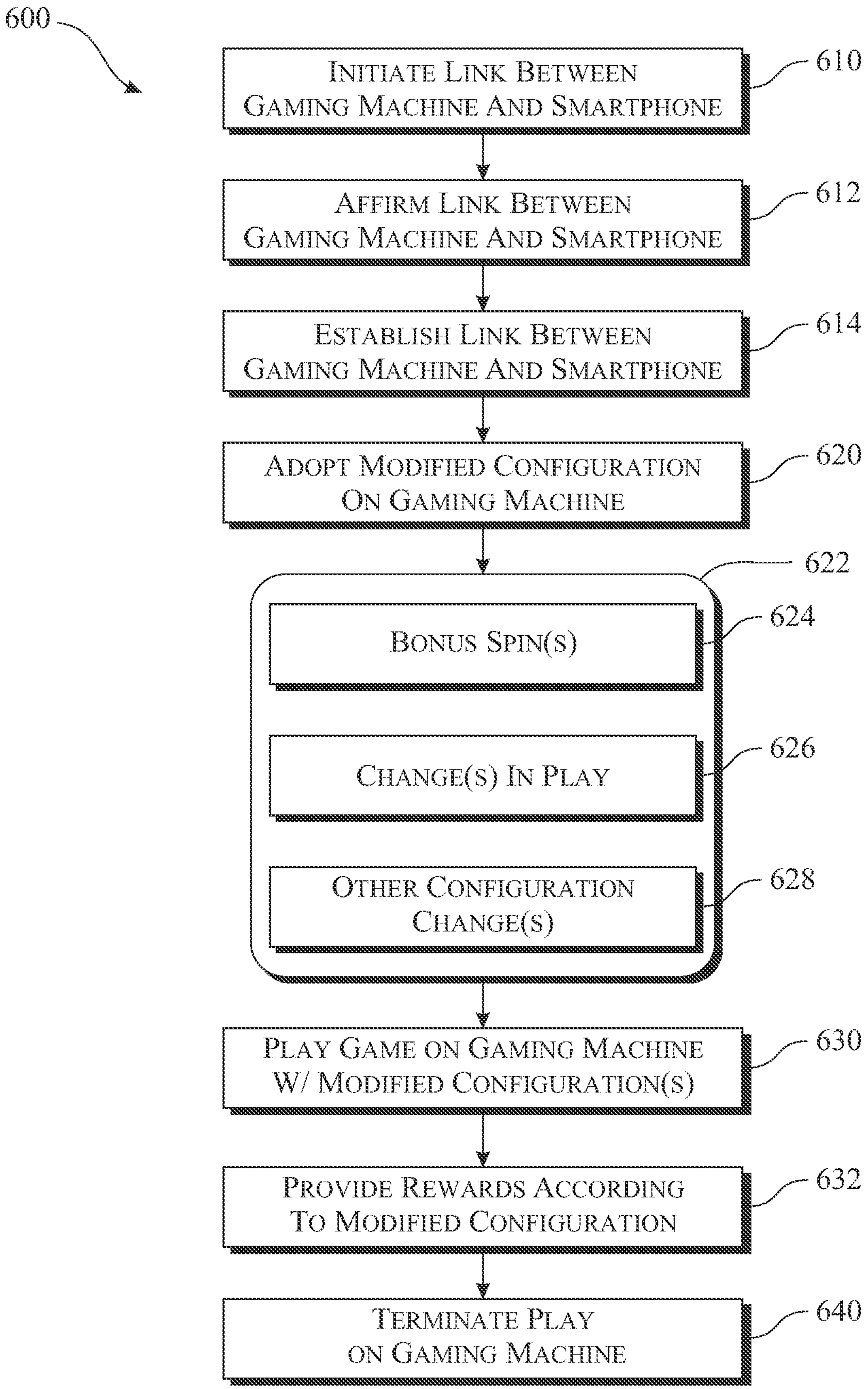
FIG. 8 presents a flow diagram illustrating exemplary operational steps of a method of using a portable computing device as a gaming controller for providing player instructions to a gaming machine in accordance with the present invention.

One a link or association is established between the automated gaming machine 100 and the portable computing device 200, the gaming instruction set on the automated gaming machine 100 can be modified to accommodate a customized protocol based upon the player and/or the wireless linked profile, such as in linked gaming machine and Smartphone gaming configuration modification flow diagram 600, presented in FIG. 8.

A first step of the linked gaming machine and Smartphone gaming configuration modification flow diagram 600 is a step of initiating a link between the automated gaming machine 100 and the portable computing device 200 (step 610). One method of accomplishing this step would be to generate a unique associating link code. The associating link code would then be returned to the automated gaming machine 100 using any suitable process. The reported associating link code would be compared to the generated associating link code to affirm or reject the request. The process would continue in a condition where the reported associating link code is affirmed (step 612). Upon affirming the reported associating link code compared to the generated associating link code, the automated gaming machine 100 and the portable computing device 200 establish a link therebetween (step 614). Upon establishing of the link between the automated gaming machine 100 and the portable computing device 200 the game instruction set of the portable computing device 200 can be modified (step 620). The modifications can include any or all of the adopting modified configurations to the gaming machine exemplary options 622. The custom instruction set would modify the game play 626, the method of determining bonus spin(s) 624, and the like 628. Examples of some modifications include introduction of a consideration for at least one bonus spin 624, a bonus game, bonus time, extra card (or other play element) change, a consideration for changes in the game play rules 626, a consideration for changes in the game payout rules, a percentage increase for a payout, a fixed amount increase for a payout, and a consideration for any additional benefit to the player 628. The modifications can be provided prior to play on the automated gaming machine 100 (step 630), during play on the automated gaming machine 100, between games on the automated gaming machine 100, or any other reasonable time. The automated gaming machine 100 would proceed in accordance with the modified instruction set and issue rewards accordingly (step 632). The player would continue playing games on the automated gaming machine 100 until a point when the player decides to terminate play on the automated gaming machine 100 (step 640). Upon termination of play, the link or association between the automated gaming machine 100 and the portable computing device 200 would be discontinued. Alternatively, the link between the automated gaming machine 100 and the portable computing device 200 can be discontinued by the player, thus ending play on the automated gaming machine 100 (step 640).

Figure 9:
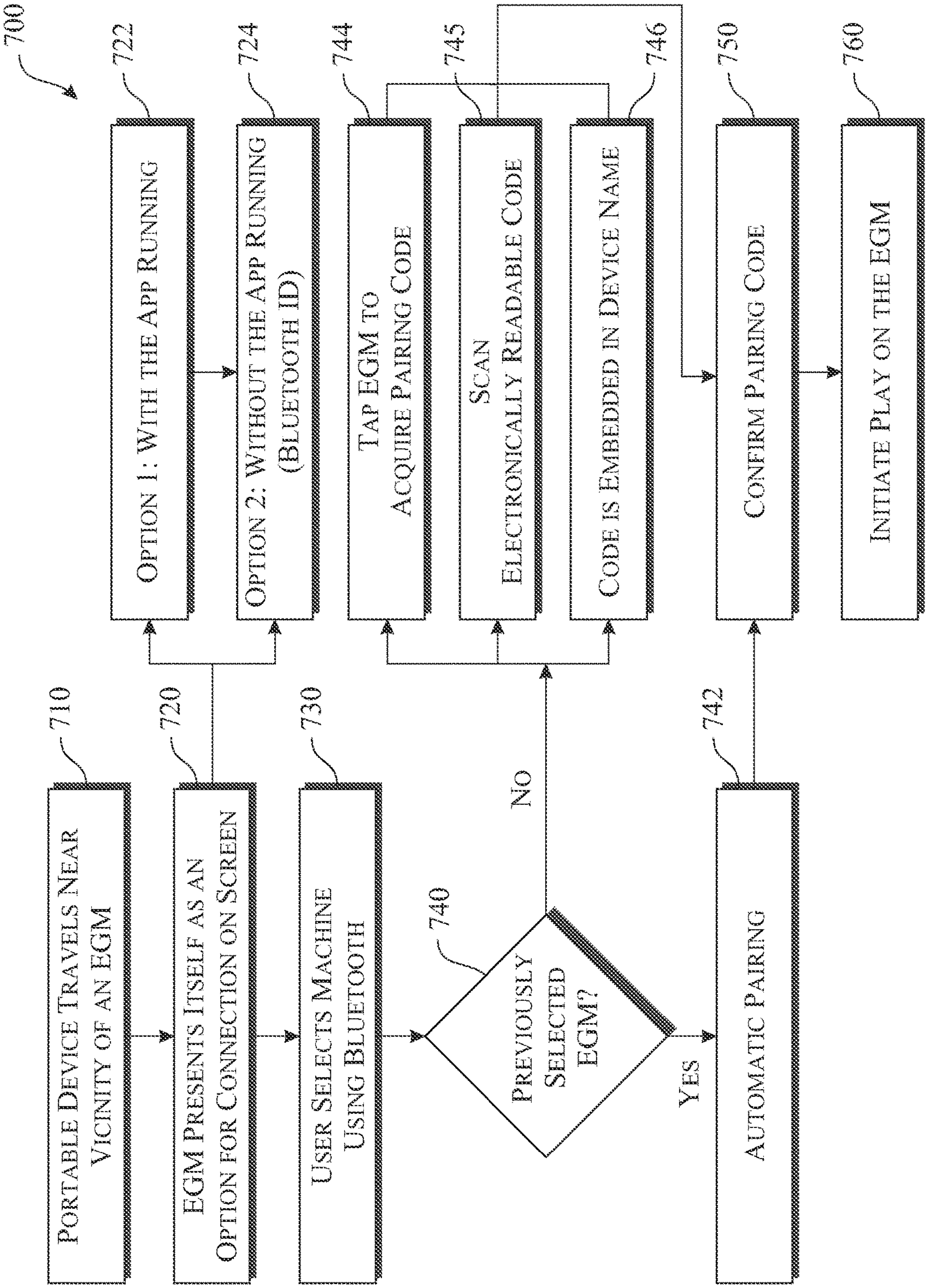
FIG. 9 presents a flow diagram illustrating exemplary operational steps of a first method of pairing a portable computing device and an Electronic Gaming Machine (EGM) in accordance with the present invention.

The portable computing device 200 can be linked or paired to the electronic gaming machine 100 using any suitable pairing process. Certain pairing processes may be desirous over others. A portable device pairing flow diagram 700, presented in FIG. 9, is a first exemplary process for pairing the portable computing device 200 with the electronic gaming machine 100. When the portable computing device 200 travels within a range of the transmission from the pairing transceiver 164, 165 of the electronic gaming machine 100 of the Electronic Gaming Machine (EGM) 100 (step 710), the Electronic Gaming Machine (EGM) 100 would present itself on the portable computing device display 212 of the portable computing device 200 (step 712). This can be accomplished using any of a variety of methods. A first method would be when an Application (App) providing connectivity to Electronic Gaming Machines (EGM's) 100 is running (block 722). The App would identify when the portable computing device 200 travels within a range of the transmission from the pairing transceiver 164, 165 of the electronic gaming machine 100 of the Electronic Gaming Machine (EGM) 100. In one example, this can be accomplished by identifying when a new device name is added to a list of device names. In another example, this can be accomplished by receipt of a message from the Electronic Gaming Machine (EGM) 100 by the Application (App). The Application (App) would display a notification to the user on the portable computing device display 212 of the portable computing device 200.

A second method would be when the Application (App) providing connectivity to Electronic Gaming Machines (EGM's) 100 is not running or alternatively, exclusive of the Application (App) (block 724). The portable computing device 200 would determine when the portable computing device 200 travels within a range of the transmission from the pairing transceiver 164, 165 of the electronic gaming machine 100. Upon coming within range, the portable computing device 200 would display a notification to the user on the portable computing device display 212 of the portable computing device 200. Since the Electronic Gaming Machines (EGM's) 100 are commonly positioned in close proximity with one another, it would be common to have multiple Electronic Gaming Machines (EGM's) 100 included in a list of device names. The user would select the device name (step 730) associated with the Electronic Gaming Machine (EGM) 100 which the user desires to play games upon.

The process completes a decision step to determine if the selected device name was previously selected (decision step 740). In a condition where the selected device name was previously selected (yes to decision step 740), the process continues with an automatic pairing process (step 742) wherein the pairing process continues utilizing a previously provided and stored pairing code information.

In a condition where the selected device name was not previously selected (no to decision step 740), the pairing code must be acquired. The pairing code can be acquired using any of a variety of processes. Several processes are presented in the exemplary portable device pairing flow diagram 700. A first exemplary pairing code acquisition process is accomplished by tapping the hot spot 161 on the electronic gaming machine 100 (step 744). The tapping would preferably be accomplished subsequent to the step of selecting the device name (step 730). A second exemplary pairing code acquisition process is accomplished by scanning an electronically readable code (step 745), such as a machine readable association linking code image 156 that would be displayed on or proximate to the electronic gaming machine 100.

A third exemplary pairing code acquisition process is accomplished by decoding the device name, wherein the pairing code is encoded in the device name (step 746). The encoded pairing code can be identified as a predetermined number of characters within the device name. The encoded pairing code can be identified as a predetermined number of characters at a suffix portion of the device name. The encoded pairing code can be identified as a predetermined number of characters at a prefix portion of the device name. The encoded pairing code can be identified by one or more distinct characters prior to the pairing code within the device name. For example, the device name can be presented in a form of: "devicename?=1234". The distinct identifying characters would be "?=". The device name would be the full name "devicename?=1234". The pairing code would be decoded as "1234".

In yet another pairing process, the Electronic Gaming Machine (EGM) 100 can provide a notification to the portable computing device 200, where the notification displays the pairing code on the portable computing device display 212 for the player to manually enter.

Each of the above pairing processes would be independent of any requirement for communication between the Electronic Gaming Machine (EGM) 100 and a gaming network within the gaming facility (commonly a casino). The pairing process does not require any validation of the identity of the player, such as actual or virtual entry of a player's card.

Upon acquisition of the pairing code, the pairing code is provided from the portable computing device 200 to the electronic gaming machine 100. The electronic gaming machine 100 confirms the pairing code (step 750) and the pairing process is completed, creating a bi-directional communication link between the electronic gaming machine 100 and the portable computing device 200. Once the portable computing device 200 is in communication with the electronic gaming machine 100, play of the game on the electronic gaming machine 100 is initiated (step 760).

Figure 10:
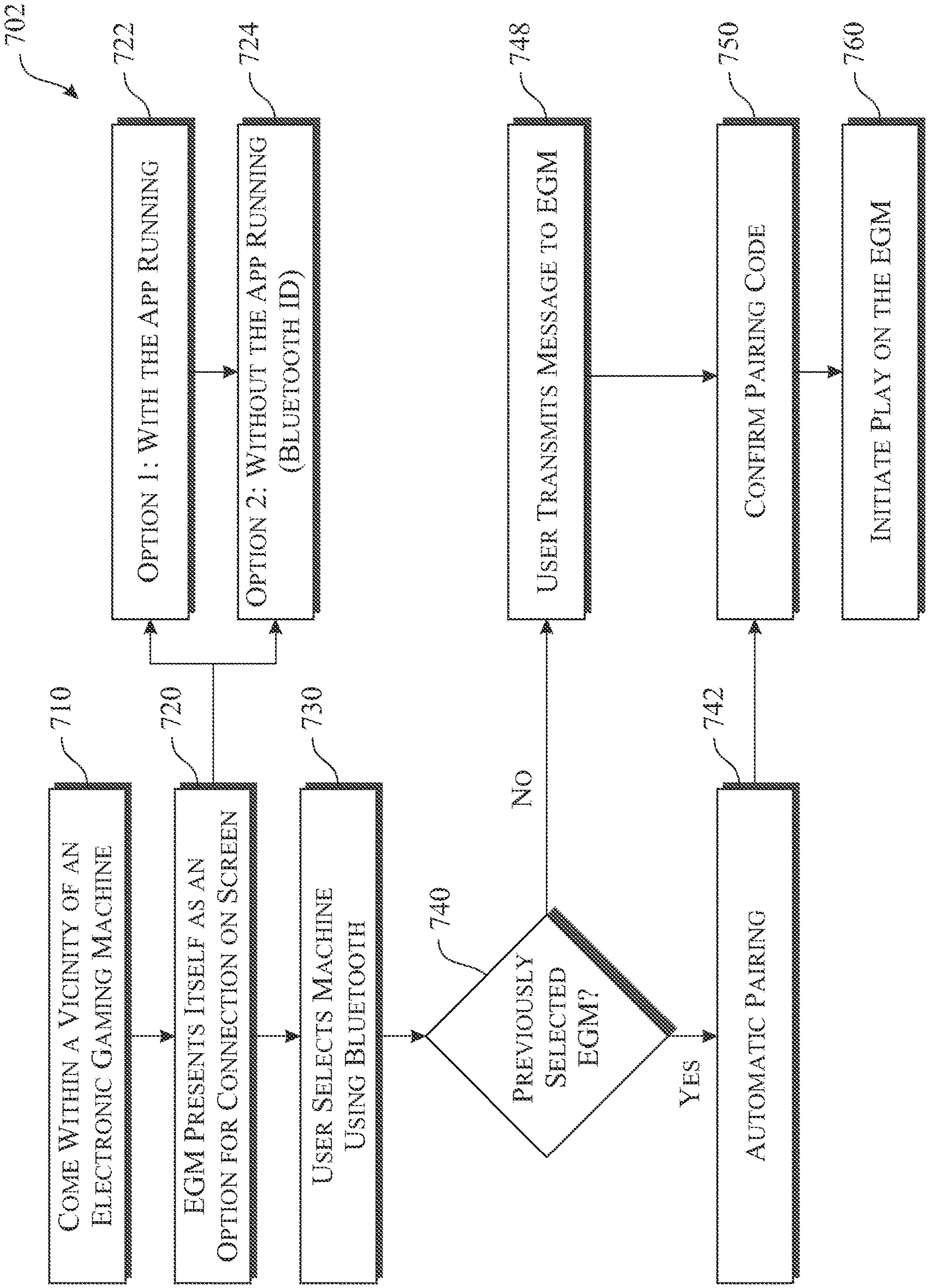
FIG. 10 presents a flow diagram illustrating exemplary operational steps of a second method of pairing a portable computing device and an Electronic Gaming Machine (EGM) in accordance with the present invention.

The portable device pairing flow diagram 700 can be modified, such as a process described in portable device pairing flow diagram 702, presented in FIG. 10. In the portable device pairing flow diagram 702, the process for pairing is modified. In a condition where the selected device name was not previously selected (no to decision step 740), the process for pairing the electronic gaming machine 100 and the portable computing device 200 is accomplished by transmitting a message from the portable computing device 200 to the electronic gaming machine 100 (step 748). The electronic gaming machine 100 then accomplishes the pairing process (750). The other steps in the portable device pairing flow diagram 702 replicate the steps as described in the portable device pairing flow diagram 700.

Figure 11:
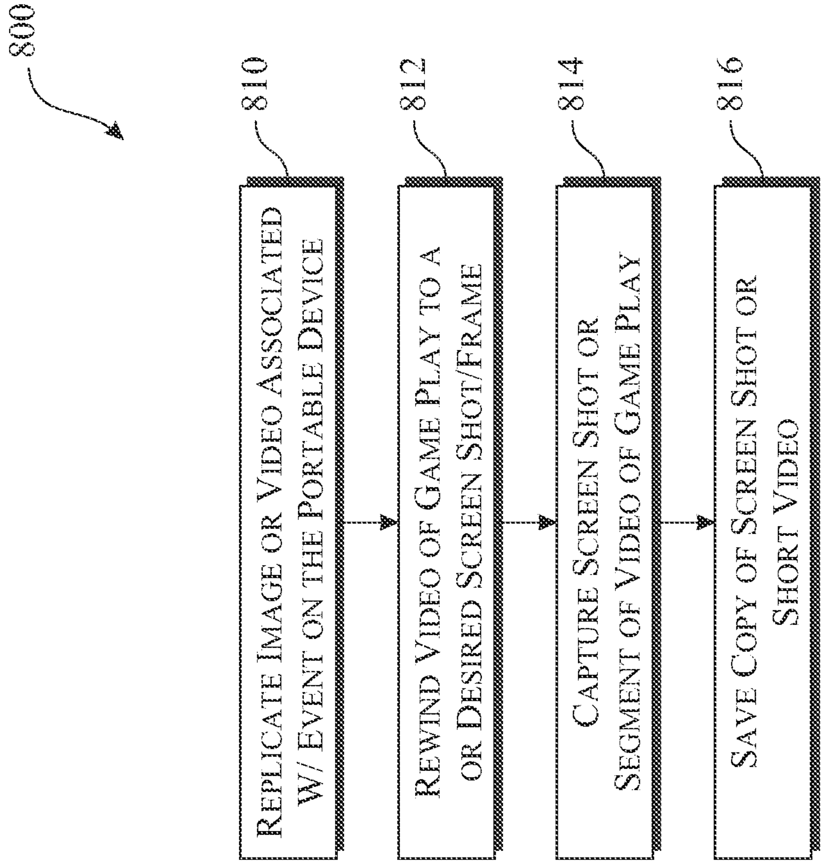
FIG. 11 presents a flow diagram illustrating exemplary operational steps of a method of capturing and storing images and/or video of the played game.

Playing games from the electronic gaming machine 100 on the portable computing device 200 introduces a unique feature. This process enables the player to manipulate the video, capture a screen shot or video segment of the game during or shortly after play, as described in an exemplary image or video management flow diagram 800 presented in FIG. 11. The image or video management flow diagram 800 initiates by replicating the images or video associated with an event on the portable computing device 200 (step 810). This can include replicating an image, a series of images, a segment of the video, a complete video or any other portion or complete play of the game played upon the electronic gaming machine 100. By replicating the game on the portable computing device 200, the replicated play enables the use of video play and editing features. This can include a function to rewind the video of the game play to a desire screen shot or frame (step 812). This also allows the player to rewind and replay a portion or the complete video of the play of the game. The function enabling rewinding and forwarding of the video of the play of the game enables the player to seek and locate a desired screen shot or frame, which then can be captured by the portable computing device 200 (step 814). The capture process can be used to acquire an image of a single frame (screen shot), a portion or segment of the video of the play of the game, or video of the entire game. Once the screen shot or video is captured, the process can propose the player save the captured video. The captured screen shot or video can then be saved to the portable computing device 200 or any other media storage device in communication with the portable computing device 200 (step 816).

Figure 12:
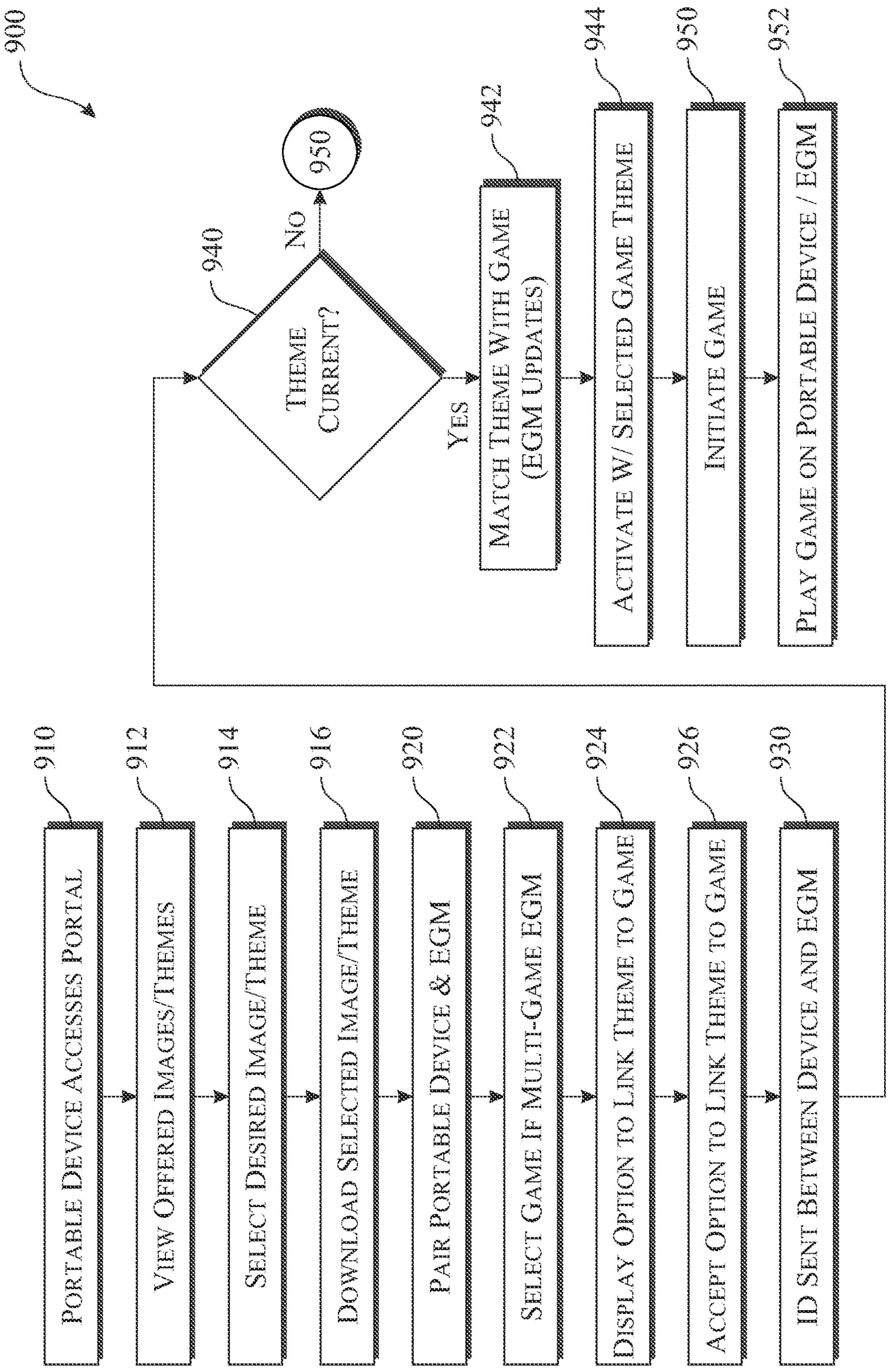
FIG. 12 presents a flow diagram illustrating exemplary operational steps of a method of selecting an image/theme to be integrated into a game during play on the Electronic Gaming Machine (EGM)

Play of the game can be customized by the player. Several exemplary processes for customizing a look or theme of a game are presented herein. A first exemplary process for customizing a look or theme of a game is described in a gaming image/theme revision process flow diagram 900, presented in FIG. 12. The gaming image/theme revision process flow diagram 900 initiates where the portable computing device 200 accesses a portal containing stored images and/or themes (step 910). Themes can comprise a series of images or video that is collectively associated with the theme. The portal can be provided in any form of accessible media storage. This can include a website, a server located at the gaming facility, a storage media located in the electronic gaming machine 100, or any other accessible storage media. Access can be provided via a wireless connection or a wired connection. The player would view the images and/or themes stored on the storage media (step 912) to determine if any of the images and/or themes is desired for use during play of the game on the electronic gaming machine 100. The player may select a desired image/theme (step 914) from the offered images and/or themes stored on the storage media. Once selected, the player would then download the selected image/theme (step 916) from the media storage to at least one of the portable computing device 200 and the electronic gaming machine 100. At some point during the process, the portable computing device 200 and the electronic gaming machine 100 would be paired, providing a communication link between one another (step 920). Certain Electronic Gaming Machines (EGM's) 100 include multiple game options for play. In this condition, the player would select a desired game from the multiple game options offered for play on the Electronic Gaming Machine (EGM) 100 (step 922). The selected image/theme can be linked or integrated into the game using any of a variety of methods. In one example, the process can include a step of presenting an option to link or integrate the selected image/theme into the game (step 924). The player would then accept the option to link or integrate the selected image/theme into the game (step 926). In an optional step, an identification can be sent between the portable computing device 200 and the electronic gaming machine 100 (optional step 930). The process can include an optional decision step to confirm that the selected image/theme is current (decision step 940). In a condition where the selected image/theme is not current (no in decision step 940), the process can inform the player as such. The player can return to step 914 and select a different image/theme. Alternatively, the process can proceed, bypassing a step of integrating the selected image/theme into the game.

In a condition where the selected image/theme is current (yes in decision step 940), the process proceeds by matching the image/theme with the game (step 942). The electronic gaming machine 100 would update the game by integrating the image/theme into the game. This can be accomplished by creating a copy of the game and replacing standard images in the game with the selected image/theme. Alternatively, the process can be accomplished by designing the games with links to images/themes. In this arrangement, the game would redirect the link to the selected image/theme. Any other appropriate method of integrating the image/theme into the game can be utilized. Once the image/theme is integrated into the game, the game would activate with the selected image/theme (step 944). Upon activation, the player would initiate play of the game (step 950). The play can be on the electronic gaming machine 100, the portable computing device 200, or both (step 952). As described above, the player can provide inputs to the game via the portable computing device 200. This can include use of a touch screen of the portable computing device 200, one or more buttons integrated into the portable computing device 200, a motion sensor integrated into the portable computing device 200, an electronic gyroscope integrated into the portable computing device 200, an accelerometer integrated into the portable computing device 200, an electronic compass integrated into the portable computing device 200, or any other input device or series of input devices.

Figure 13:
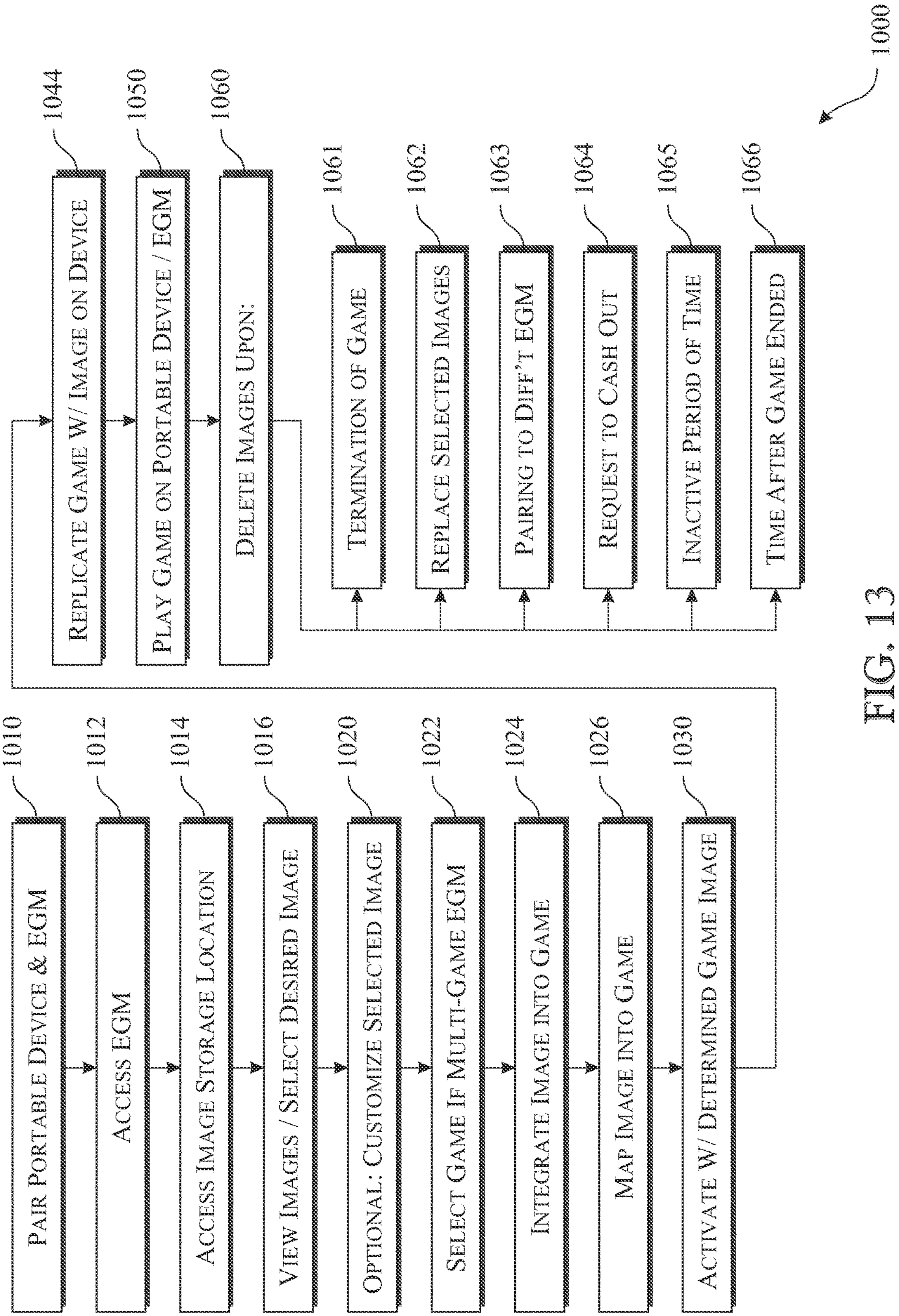
FIG. 13 presents a flow diagram illustrating exemplary operational steps of a method of selecting and managing an image/theme integrated into the game during play on the Electronic Gaming Machine (EGM).

A second exemplary process for customizing a look or theme of a game is described in a game image/theme replacement flow diagram 1000, presented in FIG. 13. The game image/theme replacement flow diagram 1000 initiates where the portable computing device 200 and the electronic gaming machine 100 are wirelessly paired with one another (step 1010). Once paired, the played accesses the electronic gaming machine 100 using the portable computing device 200 (step 1012) and browses to access a storage location containing stored images and/or themes (step 1014). The player would review the images/themes and select a desired image/theme for integration into the game (step 1016). The process can offer an optional step for customizing the selected image/theme or creating a custom image/theme (optional step 1020). Customization would be a modification of an existing image/theme offered in the stored images/themes. Customization can alternatively be accomplished by the player selecting an image or theme from their own stored images or series of images.

As mentioned above, certain Electronic Gaming Machines (EGM's) 100 include multiple game options for play. In this condition, the player would select a desired game from the multiple game options offered for play on the Electronic Gaming Machine (EGM) 100 (step 1022). The selected image/theme would be linked or integrated into the game (step 1024) using any of a variety of methods, including those mentioned above. In another method, the game would include a mapping where the original image would be mapped to a location for display during play of the game. The location can move during play and the image can be modified to provide a proper perspective during movement. This arrangement is also pre-staged to support simple replacement of the images/themes of the game. Using this arrangement, the game is mapped to the selected image/theme (step 1026). More specifically, the image/theme is mapped to locations for each image within the game.

Once the image/theme is mapped within the game, the game is activated (step 1030). The displayed image/video of the modified game is preferably replicated on the portable computing device 200 (step 1044). The game is played on at least one of the portable computing device 200 and the electronic gaming machine 100 (step 1050). The portable computing device 200 can be used as an input device for providing instructions for playing the game on the electronic gaming machine 100. The inputs can be provided in any of a variety of methods, including those previously described herein.

The game would continue to be available for play with the selected image/theme until at least one of a certain condition is met. When the condition is met, the selected and used image/theme is deleted from the game (step 1060). Examples of conditions that could initiate deletion of the image/theme from the game can include at least one of the following:

a. Termination of the game (step 1061). The user can terminate play of the game using any known manner, including submission of a request via the electronic gaming machine 100 or the portable computing device 200.
b. Replacing the selected image/theme with a different image/theme (step 1062). This would be accomplished by repeating steps 1014 through 1026.
c. Pairing the portable computing device 200 to a different electronic gaming machine 100 (step 1063). The portable computing device 200 would identify when the pairing was disconnected. This step can include considerations of a brief time period to account for any temporary break in the pairing between the portable computing device 200 and the electronic gaming machine 100.
d. Request to cash out (step 1064). The user can request to cash out using any known manner, including submission of the request via the electronic gaming machine 100 or the portable computing device 200.
e. Inactivity of play of the game over a period of time (step 1065). The process can include a time monitor, wherein when the process determines a period of time of inactivity of play of the game meets/exceeds a predetermined period of time, the process considers the game as being inactive.
f. A period of time after termination of the game (step 1066). The user can terminate play of the game using any known manner, including submission of a request via the electronic gaming machine 100 or the portable computing device 200. Upon termination, the process would allow for a predetermined period of time to pass, giving the player a predetermined amount of time to reconsider and return to play the game.

In other examples of customization to the gaming machine can include modifications to introduce customize images, which would be used while the player plays the game on the gaming machine 100. For example, the modifications to the game played on the gaming machine 100 can include an introduction of characters, animals, or other images or features associated with the player whose portable computing device 200 is linked to the gaming machine 100. The modifications can be random, based upon a predetermined profile of use, based upon the specific portable computing device, based upon a profile of the player, based upon a profile provided by the application operating on the portable computing device, and the like. The profile can be stored on the portable computing device, within the game controller application 300, at a data storage server accessible by the gaming machine 100, or any other suitable data storage location. The profile can be modified by the player, the player's host (casino), both, or any other suitable party. The game controller application 300 can include a function enabling the player to modify the associated profile. The profile can be transferred to the gaming machine 100 during the linking process. The player's account can include multiple profiles, where the player can select one profile for use during the respective play period.

Although the game controller application flow diagram 500 presents the steps in a certain order, it is understood that the order of the steps may vary.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

REF NO. DESCRIPTION

100 automated gaming machine
110 gaming machine enclosure
120 operating electronics circuit assembly
122 microprocessor
123 operating instruction code
124 non-volatile digital memory device
125 non-volatile digital memory mass storage device
126 gaming controller
130 payment processing mechanisms
132 currency handling system
133 paper currency
134 card reader
135 card
136 printer
137 printed output
138 currency dispensing system
140 user input device
141 slot machine arm
142 visual alerting device
144 audible output device
146 digital image acquisition device (camera)
150 automated gaming mechanism/display
152 association linking code display
154 human readable association linking code image
156 machine readable association linking code image
160 communication circuit
161 hot spot
162 proximity wireless communication services
163 Near Field Communication (NFC) protocol
164 Wi-Fi communication protocol
165 Bluetooth communication protocol
166 distant communication services
167 cellular communication protocol
168 Ethernet communication protocol
200 portable computing device
210 portable computing device housing
212 portable computing device display
222 microprocessor
224 non-volatile digital memory device
240 user input device
244 audible output device
245 audible input/output device
246 first digital image acquisition device (camera)
247 second digital image acquisition device (camera)
263 Near Field Communication (NFC) protocol
264 Wi-Fi communication protocol
265 Bluetooth communication protocol
267 cellular communication protocol
270 portable power supply
272 general interface connector
274 audio connector
280 Global Positioning System (GPS) circuitry
282 electronic gyroscope
284 light sensing device
300 game controller application
310 game machine and portable electronic device communication link
320 credit assertion button
322 spin button
330 game status replication image
400 gaming machine to Smartphone associating link flow diagram
410 generate gaming machine and Smartphone associating link step
412 display gaming machine and Smartphone associating link step
420 acquiring gaming machine and Smartphone associating link step
422 acquiring gaming machine and Smartphone associating link options
424 manually reading gaming machine and Smartphone associating link step
426 scanning computer readable gaming machine and Smartphone associating link step
428 scanning computer readable embedded gaming machine and Smartphone associating link step
432 entering gaming machine and Smartphone associating link options
434 manually entering gaming machine and Smartphone associating link step
436 automatically entering computer readable gaming machine and Smartphone associating link step
438 automatically entering and responding computer readable embedded gaming machine and Smartphone associating link step
440 associate a link between the faming machine and the Smartphone step
500 game controller application flow diagram
510 installation of gaming controller application step
520 activation of gaming controller application step
522 tap the portable computing device to the gaming machine step
524 request to establish a proximity communication link step
526 establish a proximity communication link step
530 play games on the gaming machine step
532 portable electronic device interface controls the game on the gaming machine step
534 option: utilize the touch screen interface for controlling the game step
536 option: utilize the motion controller interface for controlling the game step
540 tap the portable computing device to the gaming machine to terminate communication link step
550 request cash out step
552 terminate play on the machine step
600 linked gaming machine and Smartphone gaming configuration modification flow diagram
610 initiate gaming machine and Smartphone link step
612 affirm gaming machine and Smartphone link request step
614 establish gaming machine and Smartphone link step
620 adopt modified configuration on gaming machine step
622 adopt modified configuration on gaming machine exemplary options
624 include bonus spin(s) step
626 modifications in game play step
628 other link related modifications
630 play modified game on gaming machine step
632 provide rewards according to modified gaming instructions step
640 terminate play on the gaming machine step
700 portable device pairing flow diagram
702 portable device pairing flow diagram
710 portable device travels within the vicinity of the Electronic Gaming Machine (EGM) step
720 Electronic Gaming Machine (EGM) presents itself as an option for connection on portable device screen step

722 Electronic Gaming Machine (EGM) displayed only when application is running block
724 Electronic Gaming Machine (EGM) displayed independent if application is running block
730 user selects Electronic Gaming Machine (EGM) for Bluetooth connection step
740 Electronic Gaming Machine (EGM) previously selected decision step
742 automatic pairing step
744 tap Electronic Gaming Machine (EGM) to acquire pairing code step
745 scan electronically readable code on or proximate Electronic Gaming Machine (EGM) to acquire pairing code step
746 decode pairing code embedded within the device name step
748 user transmits message to Electronic Gaming Machine (EGM) step
750 confirm pairing code step
760 initiate play of game on the Electronic Gaming Machine (EGM) step
800 image or video management flow diagram
810 replicate image/video from the Electronic Gaming Machine (EGM) on portable device step
812 rewind game play video to a desired screen shot/frame step
814 capture screen shot or short video of desired segment of game play step
816 save captured screen shot or short video of desired segment of game play step
900 gaming image/theme revision process flow diagram
910 portable device accesses portal step
912 view themes/images offered via portal step
914 select desired image/theme from offered themes/images step
916 download selected image/theme from portal step
920 pair portable device and Electronic Gaming Machine (EGM) step
922 select game if multi-game Electronic Gaming Machine (EGM) step
924 display option to link theme to game of Electronic Gaming Machine (EGM) step
926 accept option to link theme to game of Electronic Gaming Machine (EGM) step
930 identification sent between portable device and Electronic Gaming Machine (EGM) step
940 is the image/theme current decision step
942 match image/theme with game on Electronic Gaming Machine (EGM) step
944 activate game with selected image/theme step
950 initiate game on portable device/Electronic Gaming Machine (EGM) step
952 play game on portable device/Electronic Gaming Machine (EGM) step
1000 game image/theme replacement flow diagram
1010 access Electronic Gaming Machine (EGM) step
1012 access image/theme storage location step
1014 select desired image/theme from offered themes/images step
1016 customize selected image/theme optional step
1020 pair portable device and Electronic Gaming Machine (EGM) step
1022 select game if multi-game Electronic Gaming Machine (EGM) step
1024 integrate selected image/theme into game step
1026 map image into game step
1030 activate game with selected image/theme step
1044 replicate game with selected image/theme on portable device step
1050 play game on portable device/Electronic Gaming Machine (EGM) step
1060 delete image/theme from game initiator step
1061 upon termination of game
1062 upon replacement of selected image/theme
1063 upon pairing to different Electronic Gaming Machine (EGM)
1064 upon request to cash out
1065 upon an inactive period of time
1066 upon a period of time after game ended

What is claimed is:

1. A method providing interaction between a portable computing device and a second electronic device, the method comprising steps of:

transmitting a device name using a transceiver within the second electronic device, wherein the device name includes a pairing code embedded therein;

selecting a device name identifying the second electronic device;

decoding the pairing code from the device name;

creating a wireless communication link between the portable computing device and the second electronic device by pairing the portable computing device and the second electronic device by providing the pairing code obtained from the device name of the second electronic device and confirming the provided pairing code obtained from the device name with the pairing code associated with the device name, wherein the pairing requires agreement between an association of the device name and the pairing code, wherein the pairing code is the same or a subset of the device name;

providing communications between the portable computing device and the second electronic device.

2. The method as recited in claim 1, the device name further comprising at least one pairing code identifier, wherein the pairing code identifier is provided immediately preceding the pairing code, the method further comprising a step of:

determining a first character of the pairing code by locating the at least one pairing code identifier within the device name.

3. The method as recited in claim 1, wherein the wireless link is provided using one of a Wi-Fi protocol or a Bluetooth protocol.

4. The method as recited in claim 1, wherein the second electronic device is an electronic gaming machine.

5. The method as recited in claim 1, wherein the second electronic device is an electronic gaming machine, further comprising a step of:

playing a game on the electronic gaming machine by providing entry of game play instructions on the portable computing device.

6. The method as recited in claim 1, wherein the second electronic device is an electronic gaming machine, further comprising a step of:

playing a game on the electronic gaming machine by providing entry of game play instructions on the portable computing device, wherein entry of a game play instruction includes use of a motion of the portable computing device, wherein the motion of the device is translated into the game play instruction.

7. A method providing interaction between a portable computing device and an electronic gaming machine, the method comprising steps of:

transmitting a device name using a transceiver within the electronic gaming machine, wherein the device name includes a pairing code embedded therein;

selecting the device name identifying a wireless link with the electronic gaming machine;

obtaining the pairing code for pairing the portable computing device and the electronic gaming machine from the device name of the electronic gaming machine;

creating a wireless communication link between the portable computing device and the electronic gaming machine by providing the pairing code obtained from the device name of the electronic gaming machine to the electronic gaming machine, pairing the portable computing device and the electronic gaming machine by confirming the pairing code associated with the electronic gaming machine; and playing a game on the electronic gaming machine by providing entry of game play instructions on the portable computing device provided via the wireless communication link between the portable computing device and the electronic gaming machine.

8. The method as recited in claim 7 wherein the pairing process is exclusive of any requirement for obtaining an identification of a player.

9. The method as recited in claim 7, wherein the wireless link is provided using one of a Wi-Fi protocol or a Bluetooth protocol.

10. The method as recited in claim 7, further comprising steps of:

selecting at least one of an image and a theme from a group of at least one of (a) one or more images and (b) one or more themes;

mapping the selected at least one of image and theme to the game;

playing the game, wherein the game is displaying the selected at least one of image and theme.

11. The method as recited in claim 7, further comprising steps of:

sending a request for pairing from the portable computing device to the electronic gaming machine; and completing the request for pairing by having the electronic gaming machine complete the request for pairing, resulting in pairing between the portable computing device to the electronic gaming machine.

12. The method as recited in claim 7, further comprising steps of:

parsing the pairing code from the device name.

13. The method as recited in claim 7, further comprising a step of:

playing a game on the electronic gaming machine by providing entry of game play instructions on the portable computing device, wherein entry of a game play instruction includes use of a motion of the portable computing device, wherein the motion of the portable computing device is translated into the game play instruction.

14. The method as recited in claim 7, further comprising at least one of the following steps:

(a) displaying an output of the gaming machine on the portable computing device, and (b) replicating a gaming display image of the gaming machine on the portable computing device.

15. A method providing interaction between a portable computing device and an electronic gaming machine, the method comprising steps of:

transmitting a device name using a transceiver within the electronic gaming machine, wherein the device name includes a pairing code embedded therein;

selecting the device name identifying a wireless link with the electronic gaming machine;

obtaining the pairing code for pairing the portable computing device and the electronic gaming machine from the device name of the electronic gaming machine;

creating a wireless communication link between the portable computing device and the electronic gaming machine by providing the pairing code obtained from the device name of the electronic gaming machine to the electronic gaming machine, pairing the portable computing device and the electronic gaming machine by confirming the pairing code associated with the electronic gaming machine; and playing a game on the electronic gaming machine by providing entry of game play instructions on the portable computing device provided via the wireless communication link between the portable computing device and the electronic gaming machine, wherein the pairing process is exclusive of any requirement for communication with a gaming network.

16. The method as recited in claim 15, wherein the pairing process is exclusive of at least one of:

(a) any requirement for communication with a gaming network, and (b) any requirement for obtaining an identification of a player.

17. The method as recited in claim 15, wherein the wireless link is provided using one of a Wi-Fi protocol or a Bluetooth protocol.

18. The method as recited in claim 15, further comprising a step of:

playing a game on the electronic gaming machine by providing entry of game play instructions on the portable computing device, wherein entry of a game play instruction includes use of a motion of the portable computing device, wherein the motion of the device is translated into the game play instruction.

19. The method as recited in claim 15, further comprising at least one of the following steps:

(a) displaying an output of the gaming machine on the portable computing device, and (b) replicating a gaming display image of the gaming machine on the portable computing device.

20. The method as recited in claim 15, further comprising a step of:

selecting at least one of an image and a theme from a group of at least one of (a) one or more images and (b) one or more themes;

mapping the selected at least one of image and theme to the game;

playing the game, wherein the game is displaying the selected at least one of image and theme.

* * * * *